United States Patent
Nocete et al.

(10) Patent No.: US 12,425,887 B2
(45) Date of Patent: Sep. 23, 2025

(54) PREPLANNED SITE SWAP

(71) Applicant: DISH WIRELESS L.L.C, Englewood, CO (US)

(72) Inventors: Neil Nocete, Fairfax, VA (US); Dilip Tandekar, Herndon, VA (US); Gurpreet Sohi, Parker, CO (US); Sourabh Gupta, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 396 days.

(21) Appl. No.: 18/087,089

(22) Filed: Dec. 22, 2022

(65) Prior Publication Data

US 2024/0214841 A1    Jun. 27, 2024

(51) Int. Cl.
*H04W 24/04* (2009.01)
*H04W 72/0453* (2023.01)

(52) U.S. Cl.
CPC ....... *H04W 24/04* (2013.01); *H04W 72/0453* (2013.01)

(58) Field of Classification Search
CPC ............. H04W 24/04; H04W 72/0453; H04W 16/04; H04W 52/0206; H04W 16/32
See application file for complete search history.

(56) References Cited

U.S. PATENT DOCUMENTS

| | | | |
|---|---|---|---|
| 9,485,723 B2* | 11/2016 | Chakraborty | H04W 24/02 |
| 10,128,685 B2* | 11/2018 | Hanley | H02J 9/061 |
| 10,868,471 B2* | 12/2020 | Fischer | H01Q 1/002 |
| 2006/0182262 A1* | 8/2006 | Goldman | G06F 1/30 |
| | | | 379/323 |
| 2021/0297946 A1* | 9/2021 | Menon | H02J 9/002 |
| 2022/0039007 A1* | 2/2022 | Mehta | H04W 72/12 |
| 2022/0070769 A1* | 3/2022 | Crofford | H04W 24/04 |

* cited by examiner

*Primary Examiner* — Kenneth T Lam
(74) *Attorney, Agent, or Firm* — Seed Intellectual Property Law Group LLP

(57) ABSTRACT

A system and method that detects initiation of a triggering event associated with a coverage area having a plurality of macrosites. The system and method further activate an auxiliary power source at each of a predetermined number of selected macrosites, the selected macrosites being ones of the plurality of macrosites. A number of the plurality of macrosites is greater than the predetermined number of selected macrosites. The system and method further include temporarily disabling at least one macrosite other than the selected macrosites.

19 Claims, 15 Drawing Sheets

PREPLANNED SITE SWAP

BACKGROUND

Demand for mobile bandwidth continues to grow as customers access new services and applications. To remain competitive, telecommunications companies are cost-effectively expanding their network while also improving user experience.

To optimize a telecommunications network, power management is a consideration. In known configurations, a person overseeing a state of operations will send an alert upon noticing a power outage, and/or otherwise manually take action to manage power across the network. However, such a system is labor-intensive, prone to error, slow, and fails to properly optimize power not only in situations where a power outage occurs locally, but across the network generally.

SUMMARY

Embodiments of the instant application allow for optimization of power across a telecommunications system so that in a case of a power outage, effective and efficient power management can occur.

According to such embodiments, the method may include detecting initiation of a triggering event associated with a coverage area having a plurality of macrosites. The method may further include activating an auxiliary power source at each of a predetermined number of selected macrosites, the selected macrosites being ones of the plurality of macrosites. A number of the plurality of macrosites is greater than the predetermined number of selected macrosites. The method may still further include temporarily disabling at least one macrosite other than the selected macrosites.

In some embodiments, a system for preplanning a cellular network for a triggering event is provided. The system includes a cloud-based architecture including a plurality of servers with one or more respective hardware processors. The cloud-based architecture can detect an initiation of the triggering event, activate an auxiliary power source for each of selected macrosites, and temporarily disable at least one macrosite other than the selected macrosites.

In some embodiments, a cellular network comprising an observability framework is provided. The network may have a hardware processor programmed to, while operating the observability framework: detect an initiation of the triggering event, activate an auxiliary power source for the each of selected macrosites, and temporarily disable at least one macrosite other than the selected macrosites.

DETAILED DESCRIPTION OF EMBODIMENTS

There are generally three sizes of cells, which are service areas provided by cellular base stations. First is the macro cell, serviced by a macro base station and which may have a traditional cell tower permanently installed on a property or otherwise permanently or removably mounted at a location, and usually having a battery backup storage. The macro cells provide coverage over a broad area and serve as the backbone of the network.

The other cells are small cells and micro cells, serviced by base stations that are more compact and can be integrated into buildings, light poles, and so forth. Some of these small and macro base stations may be attached to trailers and are referred to as mobile base stations. The small and micro cells fill in the service holes of the macro cells, and provide service inside buildings, inside tunnels, under bridges, and other places where macro cell service is poor. The small and micro cells can also be deployed in areas where extra bandwidth is needed, such as sports stadiums or other areas where large gatherings are expected. The small and micro base stations may or may not have backup battery storage.

Cell sites (i.e. cellular base stations) include macrosites, also known in the art as macro cell sites), which in turn include Remote Radio Units (RRUs) provide wireless access to the data network to user equipment (UE). RRUs are a type of Radio Unit (RU), both of which contain RF circuitry, analog-to-digital converters, digital-to-analog converters, and so forth to perform wireless communication using a cellular antenna at the cell site. Sometimes, cell sites experience power outages, and service continuity is desired. However, backup power storage is limited.

When a power outage in a particular area occurs, power supply is cut over to battery backup power at any affected cell site that has a battery backup. However, due to the cost and maintenance limitations that having battery backups at all cell sites would occur, systems and methods as described herein may allow for an optimized network where cell sites with battery backups are provided at particular locations.

In some instances, an observability framework (OBF) is used to determine which locations, or macrosites, to provide an auxiliary power source at, and to automatically notify the RAN Operations, Administration, and Maintenance (OAM) system of a power outage event or other event affecting power to at least one macrosite and configure the network to utilize such auxiliary power sources to allow for wide network coverage to most or all users for some, most or all available functions despite the event.

Network Structure and Hardware

In an exemplary network structure, such as a cellular network structure or a 5G cellular network structure, includes a plurality of macrosites. Each macrosite will include specialized hardware and software to aid in providing cellular service to subscribers.

Figure 1:
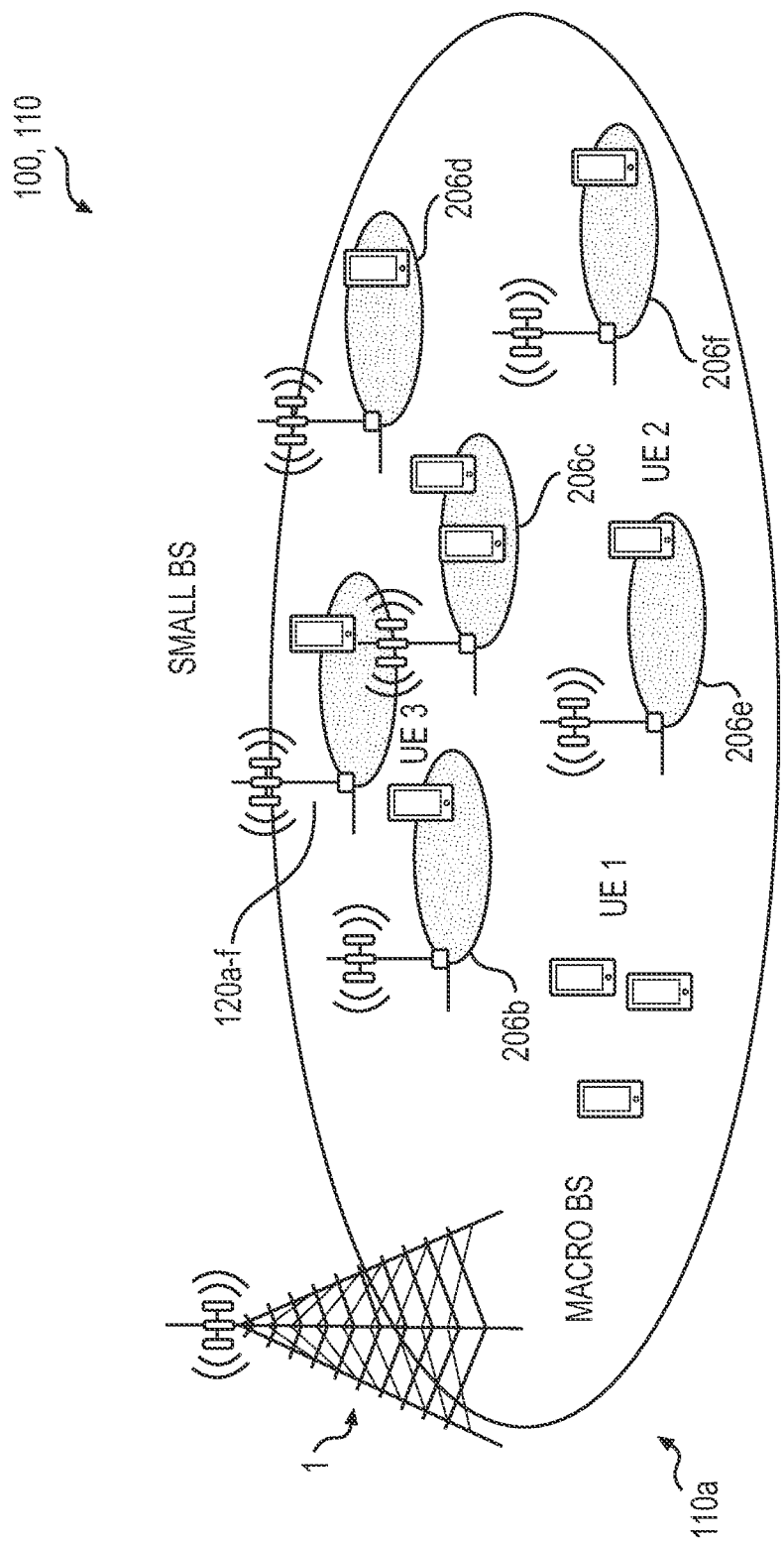
FIG. 1 illustrates a diagram of a portion of a cellular network according to some embodiments.

FIG. 1 is a diagram of a portion of an exemplary 5G or other network 100 having a cell site 110 having a macrosite 110a. Within each portion of the network that is fed by the cell site 110 and corresponding macrosite 110a, there are a plurality of smaller radio cell sites, diagrammed as small cell sites 120a-120f. Each of the macrosite 110a and the small cell sites 120a-120f is allocated a band of frequencies and is served by a base station, which includes a transmitter, receiver and control unit. Adjacent cells are assigned different frequencies to avoid crosstalk or interference. However, cells that are sufficiently distant from each other can use the same frequency band.

The macrosite 110a and small cell sites 120a-f together provide access to the core network for any number of mobile devices and other user equipment. For example, each small cell site 120a-f will receive transmissions from one or more user equipment UE 1, UE 2, UE3. The user equipment may be, for example, a cellular phone including a smart phone, or some other electronic device with cellular service capability such as a tablet, computer, smartwatch, television, or the like. In a macrosite, the RU device or RRU 113 is mounted on a cell tower that is higher than the surrounding buildings or terrain to avoid obstruction to signals transmitted to and received from the macrosite. The range of coverage of the macrosite may extend approximately from about 2 to about 25 miles, or about 5 to about 18 miles, or about 10 miles in any direction. A macrosite may be capable of serving a large town, though in some scenarios the network may include multiple macrosites to handle coverage for a larger area, or where larger frequencies and/or bandwidths are required within a particular coverage area. In some very large cities, hundreds, or even thousands, of macrosites may be positioned in order to provide a desired scope of network coverage to subscribers.

In a 5G network having a portion thereof such as network 100 including a portion as shown in FIG. 1, small cells, for example small cells 120a-f in FIG. 1, complement macrosites, such as macrosite 110a, by providing network capacity for densely populated areas, thereby contributing to the formation of a heterogeneous network. The deployment of each small cell is localized, such that the small cell transmits radio signals to provide cellular and Internet services within small geographic areas. Thus, small cells are ideal for areas where signals are otherwise weak or unavailable.

There are at least three types of small cells, including femtocells, picocells and microcells. These may differ based on size, place of deployment (i.e., indoor or outdoor), range of coverage, and amount of power consumption. For example, a femtocell is typically used indoors, and supports a limited number of users at a coverage range of about 30 feet. Picocells have a range of up to 656 feet and can be mounted as both in indoor and outdoor cell sites. Microcells cover just over a mile, and may be deployed both indoors and outdoors. Femtocells and picocells have low power consumption relative to the high power consumption of macrosites, whereas a microcell has moderate power consumption relative to a macrosite's high power consumption.

Figure 2:
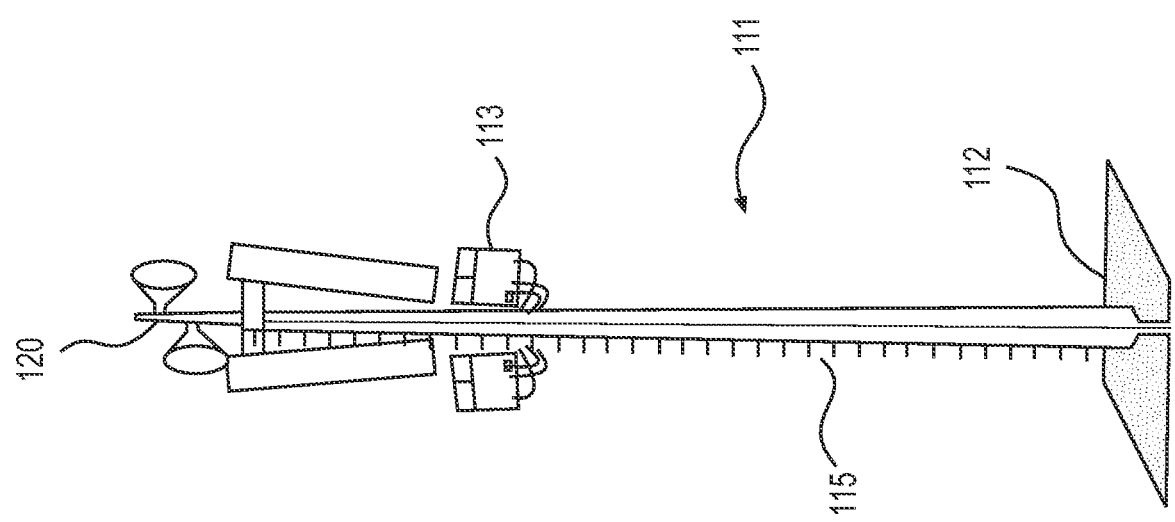
FIG. 2 illustrates a diagram of a cell site within a cellular network according to some embodiments.

FIG. 2 is a detailed view of the hardware and software provided within the exemplary macrosite 110a. Referring to FIG. 2, each macrosite 110a is a subset of the cell site 110, and can be implemented as or include an RAN base station 111, which is a cellular-enabled (including 5G enabled) mobile device site where antennas 120 and electronic communications equipment are placed to create a cell, or adjacent cells, in the cellular network. The basic structure of the RAN base station 111 includes a baseband unit (BBU) 112, a radiofrequency processing unit (i.e., a radio unit (RU) device) 113, one or more antennas 120, and software-based interfaces, described in more detail later.

The RAN base station 111 is a RAN element that performs radio transmission and reception in one or more cells to or from the user equipment. Specifically, the RAN base station 111 includes a tower 111a, and provides signals to the user equipment (e.g., some or all of the UE1-UE3 in FIG. 1, and others), and wirelessly interfaces the user equipment to the RAN infrastructure. The RAN base station 111 can have an integrated antenna, or as shown in FIG. 2, can have a connection to the antenna 120 by feeder cables. In the exemplary macrosite 110a illustrated in FIG. 2, the RAN base station 111 includes: an antenna-feeder system, which has one or more antennas 120 mounted to the tower 111a or mast; one or more RU devices such as RRU 113 mounted on the cell tower 111a or mast; a BBU 112; and a support system consisting of various other types of equipment, as described in more detail below.

Figure 3:
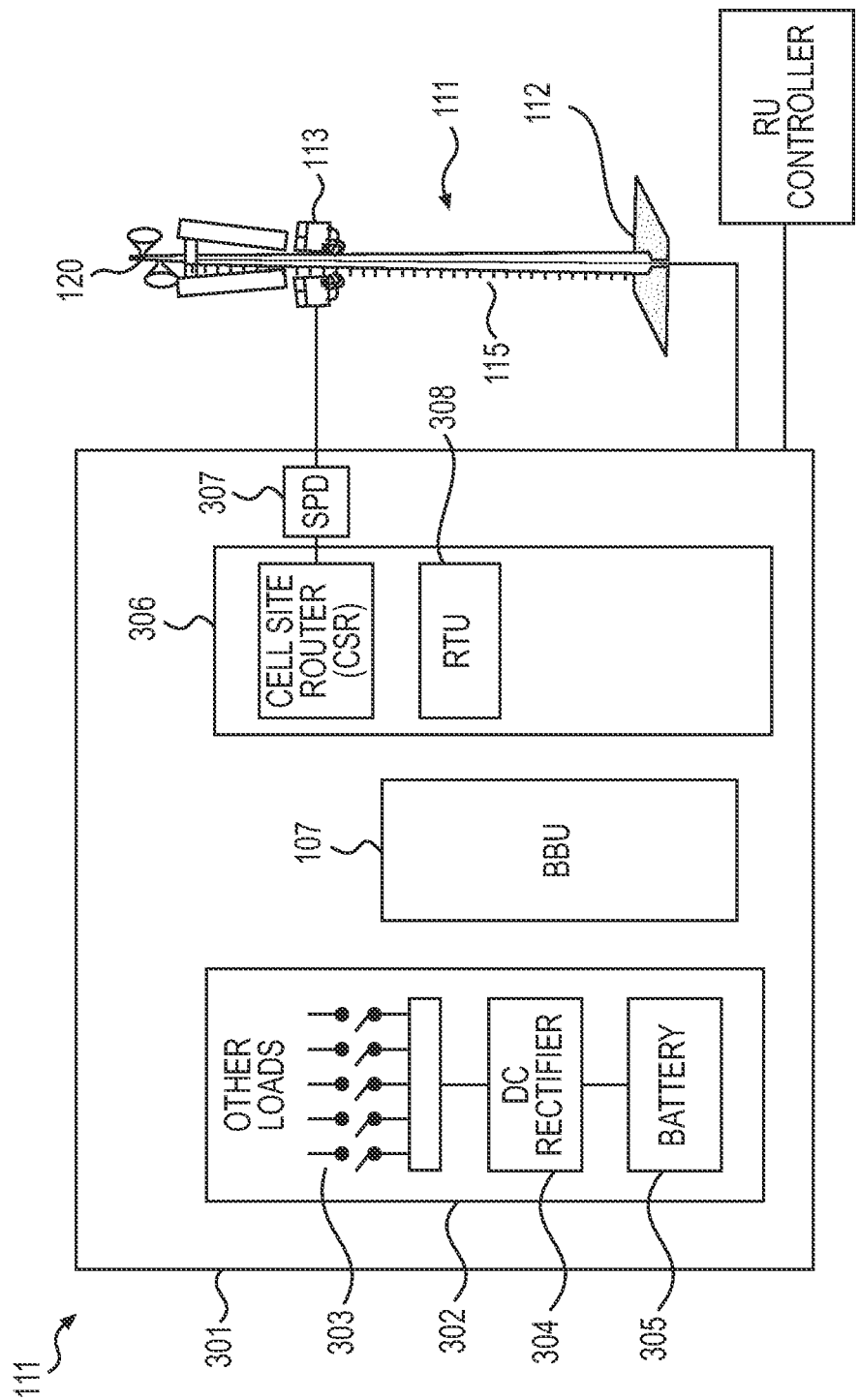
FIG. 3 illustrates a diagram of hardware within a housing of the cell site of FIG. 2.

The support system of the RAN base station 111 may include elements such as an air conditioner, power supplies, modems or routers, surge protector, remote terminal unit (RTU) device, and other equipment (not shown). As shown in FIG. 3, for example, in addition to the BBU 112, enclosed within equipment housing 301 are: a power supply 302, which includes a DC rectifier 304 and, in some cases, an auxiliary power unit. In some examples, the auxiliary power unit is implemented as at least one backup battery 305. As described in further detail herein, some, but not all, macrosites within the network may include such an auxiliary power unit.

The equipment housing 301 may also house switches 303, which provide connectivity between the power supply 302 and equipment on the cell site requiring power; a cell site router (CSR) 306, which provides connectivity between the RAN and the 5G core network by aggregating traffic from the BBU and then backhauling the traffic over an aggregation network to the core network; a surge protective device (SPD) for providing lightning and surge protection for the base station and cell sites; and a remote terminal unit (RTU) device 308.

In normal operation, power delivery to the RAN base station 111 may be supplied via the power supply 302 as AC power from a public utility or other sources. The AC power is rectified via the rectifier 304 and regulated to a nominal measured DC voltage, which may also be fed to the backup battery 305 or a set of backup batteries for charging. The rectifier 304 includes circuitry to keep the batteries fully charged and ready in case of a commercial power interrupt or failure. At full charge, the backup battery may be kept at a voltage of about 50 volts. However, vendors or operators may opt for a DC voltage of −24V or other DC voltage setting and not the typical 48V setting. The battery pack parameter, in general, per customer's requirement, is in the order of 2-hour work time or other operator backup time settings (e.g., the operators may choose a 2-hour battery backup, 4-hour or 8-hour, etc., as desired or required for operations) under 100 W (in this case, the power is calculated per RU power consumption and is a variable quantity) AC system, 48.1V/65 Ah battery that can last for about 150 minutes with a full load. Base stations may use a 48V input supply that is stepped down by DC/DC converters to 24V or 12V, that can be reduced to meet the DC voltage level of each module.

Figure 4:
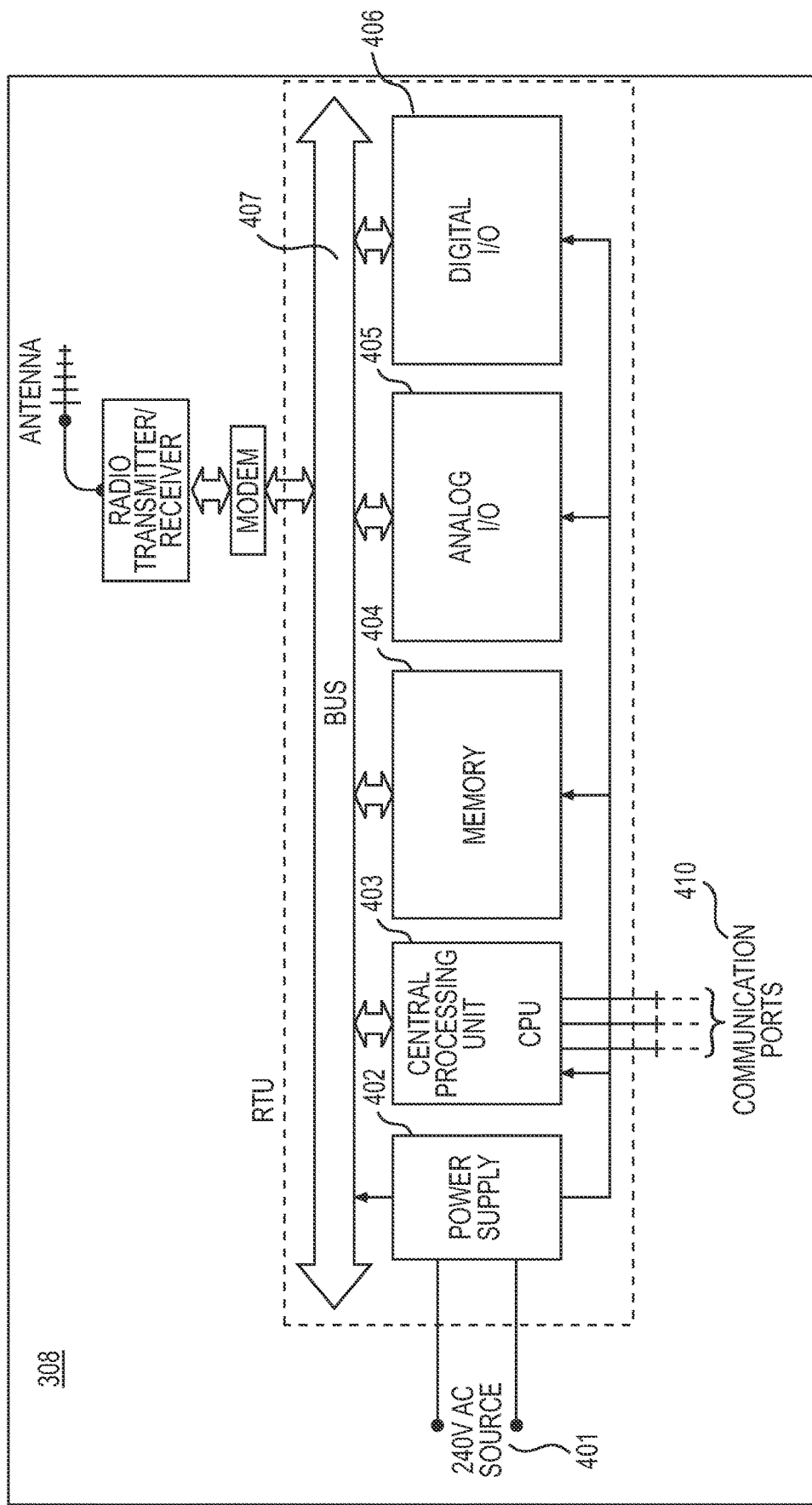
FIG. 4 illustrates a diagram showing components of a remote terminal unit housed within the cell site of FIG. 2.

The RTU device 308 is a control device that monitors, controls, and automates multiple variables and field devices at the base station. Such field devices may include actuators, sensors, and any other supporting equipment housed at the base station. An exemplary RTU device 308 is shown in the diagram of FIG. 4. As illustrated, the RTU device 308 includes: a power supply 402, which is supplied by a power source 401; one or more central processing units (CPU) 403; communication ports 410; a memory 404, which includes volatile and non-volatile memory; analog input/output modules 405; and digital input/output modules 406, where the digital input modules capture status and alarm signals coming from field devices, and the digital output modules send signals and commands to the field devices. The RTU device 308 interfaces with the field devices via a bus 407.

Network Software

Figure 5:
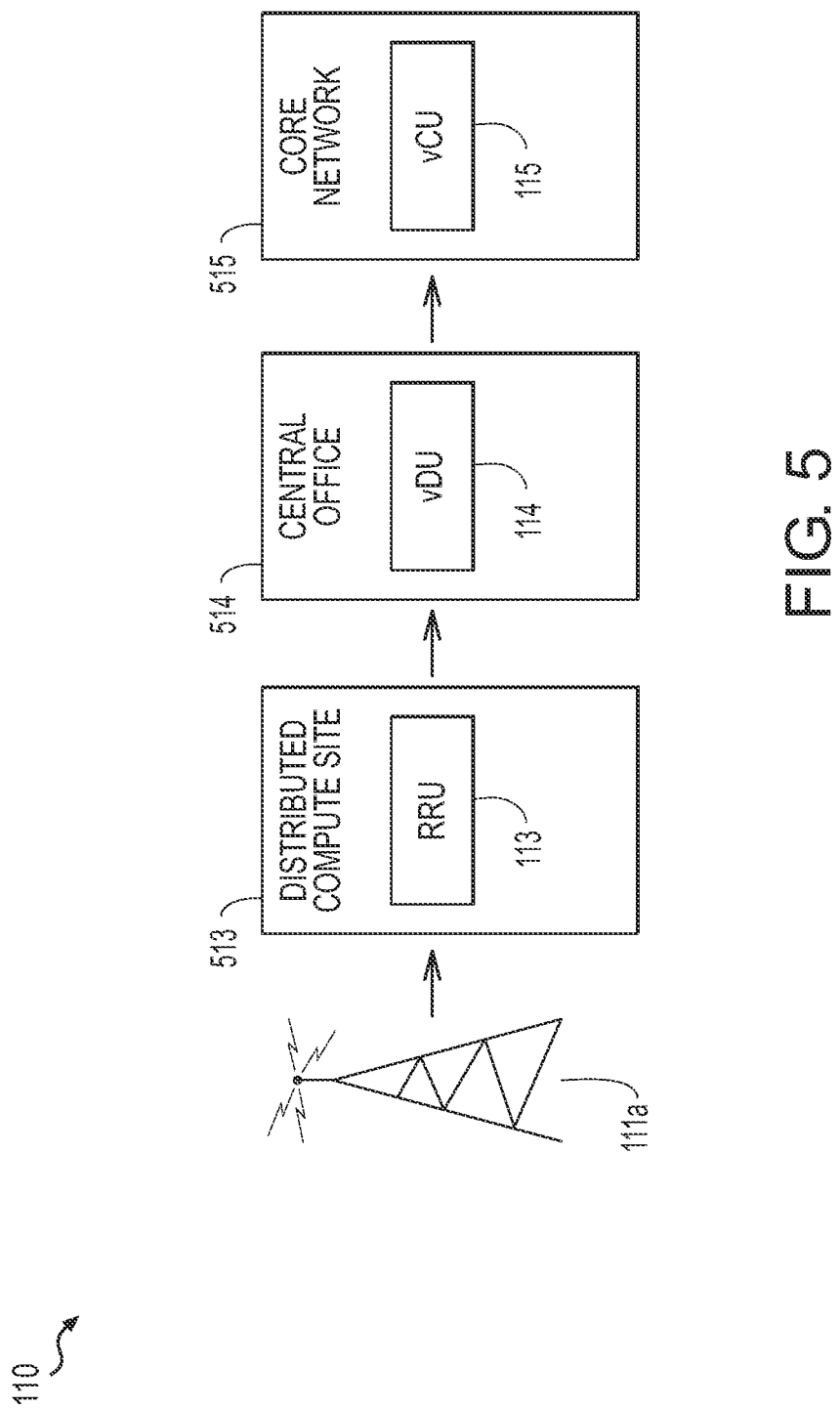
FIG. 5 illustrates a high level block diagram of a cellular network using a remote radio unit, a virtualized distributed unit and a virtualized centralized unit according to some embodiments.

As shown in FIG. 5, the RAN base station 111 (e.g., as part of macrosite 110a shown in FIG. 2) is provided with software as described herein. The RAN base station 111 includes a tower 111a and hardware as discussed with reference to FIG. 2. The RAN base station 111 also includes an radio unit (RU) or remote radio unit 113, and, either onsite or connected thereto, a virtualized distributed unit (vDU) 114, and a virtualized central unit (vCU) 115. In some embodiments, the vDU may simply be a distributed unit (DU), and the vCU may simply be a centralized unit (CU), though the embodiments described herein utilize virtualized units.

In the embodiment shown in FIG. 5, the vDU 114 is housed within a central office 514, which may be at the local macrosite or may be at a centralized location where one or more vDUs operating with one or more macrosites are housed. In the embodiment, the vCU 115 is housed within a core network 515, which may be at the local macrosite or may be at a centralized location where one or more vDUs operating with one or more macrosites are housed.

More specifically, FIG. 5 illustrates a system that delivers full RAN functionality using network functions virtualization (NFV) infrastructure. This approach decouples baseband functions from the underlying hardware and creates a software fabric. Within the solution architecture, virtualized baseband units (vBBU) process and dynamically allocate resources to RRUs 113 based on the current network needs. Baseband functions are split between vCUs 115 and vDUs 114 that can be deployed in the central office 514 or another aggregation center using a distributed architecture, such as using kubernetes.

In this embodiment, the RRU 113 is located at a distributed compute site 513, possibly at the macrosite 110a. The macrosite 110a is a location containing the antennas 120, RRU 113, and network connectivity equipment and power storage equipment described with reference to FIGS. 1-4.

RRU 113 contains a transceiver for wirelessly communicating with User Equipment (UEs), such as UE1-UE3 in FIG. 2. The vDU 114 is located at a central office 514 or local data center of the network provider. The vCU 115 is part of the core network 515 and may be a software entity that operates over a network of cloud servers.

As a nonlimiting example, the network of cloud servers, defined in more detail later, may comprise a physical, virtual, or combination of physical and virtual infrastructure whereby one or more servers can be divided, using virtualization software often including a hypervisor, into plural virtual servers. These virtual servers can include public and/or private cloud servers, and be tied to one or more processors, which can be hardware hosted at the physical server or elsewhere, and can then be accessed through the internet. In embodiments, the servers and processors together create a cloud-based architecture that can perform the functions described herein.

The distributed compute site 513 also includes a site controller and site router (i.e. network communicator). The site controller includes a processor configured to execute certain local control functions, which will be detailed further herein. The site router connects the cell site to the cellular network controllers, and provides internet service to the cell site which is distributed to the UEs wirelessly via the RRU 113.

vCUs 115 and vDUs 114 run as virtual network functions (VNFs) within the NFV infrastructure. The entire software stack that is needed is provided for NFV, including open source software. This software stack and distributed architecture increases interoperability, reliability, performance, manageability, and security across the NFV environment.

RAN standards use deterministic, low-latency, and low-jitter signal processing. These are achieved using kubernetes clusters, described later, to control each RAN. Moreover, the RAN may support different network topologies, allowing the system to choose the location and connectivity of all network components. Thus, the system allowing various vDUs 130 on kubernetes clusters allows the network to pool resources across multiple cell sites 110, scale capacity based on conditions, and ease support and maintenance requirements.

Figure 6:
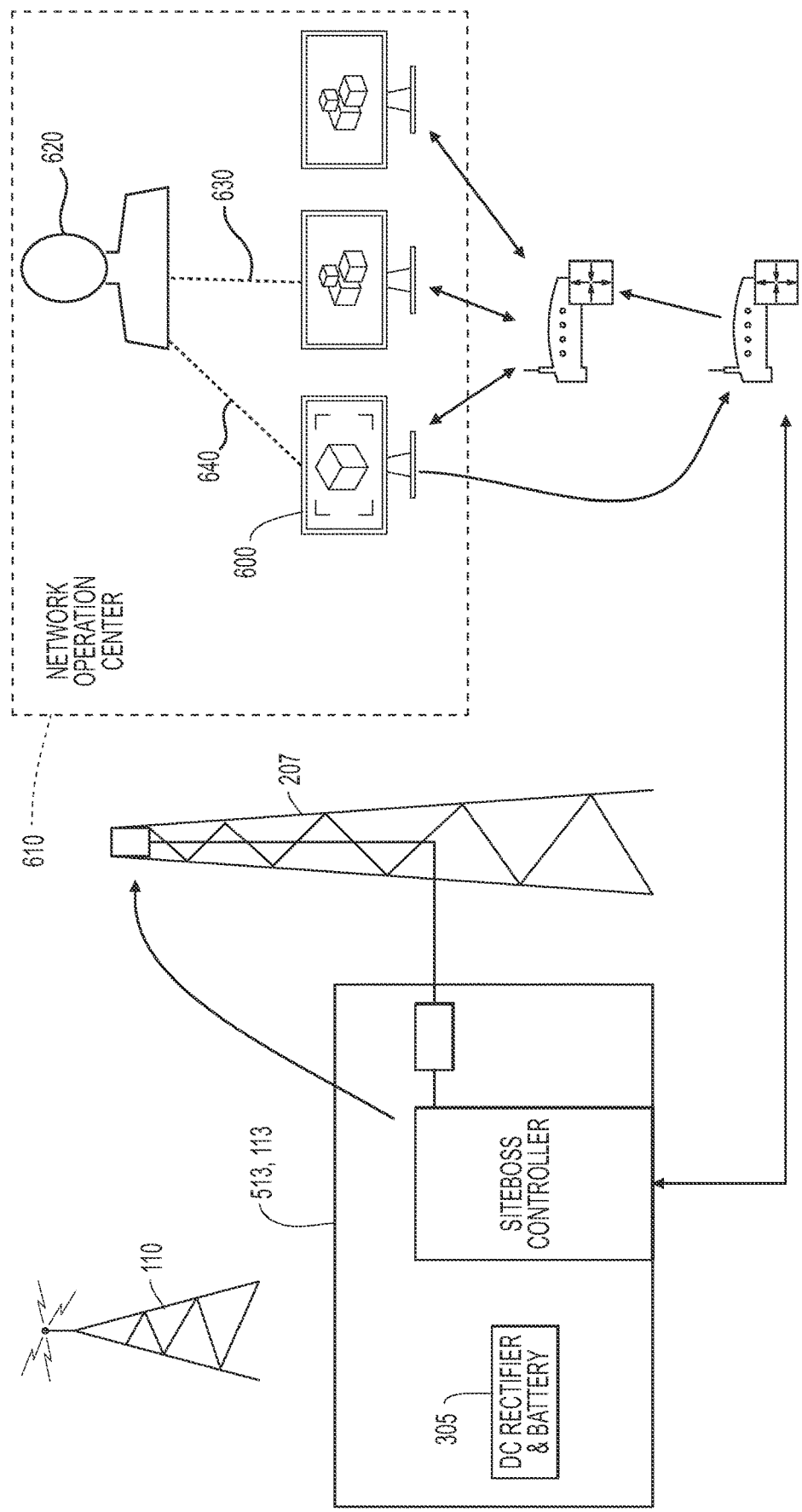
FIG. 6 illustrates a block diagram of a cellular network.

FIG. 6 shows a diagram of a cellular network. A macrosite 110a contains the radio tower 111a and a distributed compute site 513 containing RRU 113. An event (such as a power outage) is detected either at the macrosite 110a or elsewhere. An alert 630 of the event is sent to the EMS (Element Management System) or NMS (Network Management System) 600. In the prior art, EMS/NMS was implemented on a proprietary server at the network operation center (NOC) 610.

In this cellular network, a human controller 620 observes alert 630, and issues a command (e.g. power saving command) 640 which is relayed back to compute site 513. The site controller, also called a site boss controller, and which may include a hardware processor and a memory that stores instructions for the processor to implement, then implements the command 640. In the example of a power outage, the power saving command would be tailored to conserve power in a battery storage, such as an auxiliary power unit or battery backup 305, that serves as backup power for macrosite 110a.

In traditional wireless network deployment, a telecom site automation system manages power, security, and environmental at the cell site. Events like: DC power supplies and distribution (measurement and control of rectifier, battery and electric loads); environmental conditions (temperature, humidity, leakage, smoke, fire, air flow); and security (access control, intrusion detection, fuel level follow up, tower light control) can be reported by the telecom site automation system through Simple Network Management Protocol (SNMP) messages or traps. SNMP is an application-layer protocol used to manage and monitor network devices and their functions.

These SNMP traps are received by a network operator using the NOC to collect the events. The NOC then provides critical statistics for each monitored device in operator's network. In traditional operation, NOC is monitored and operated by a human being, who issues control instructions to the cell site or RRU based on the observed statistics.

Figure 7:
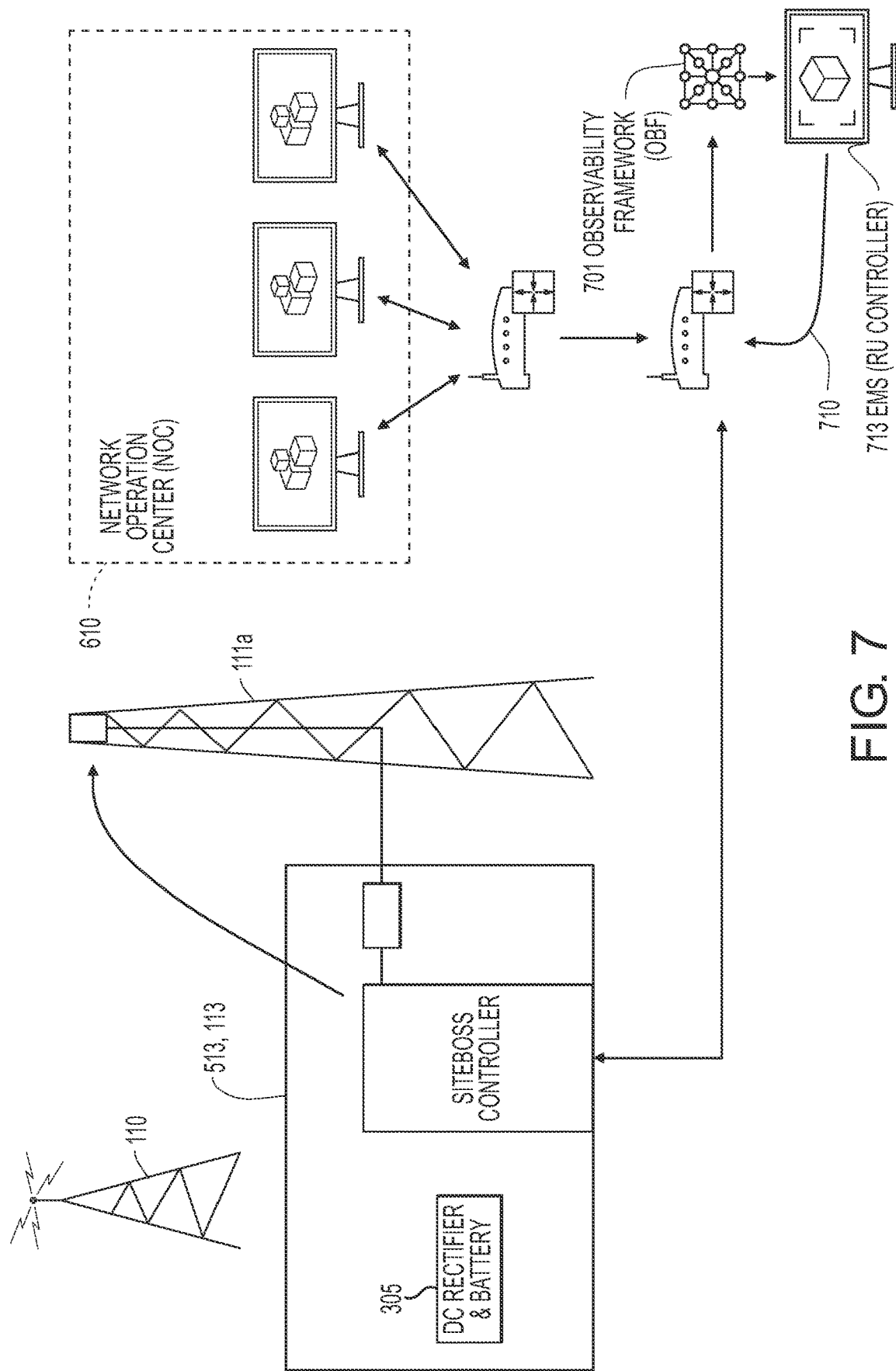
FIG. 7 illustrates a block diagram of a cellular network according to some embodiments.
Figure 8:
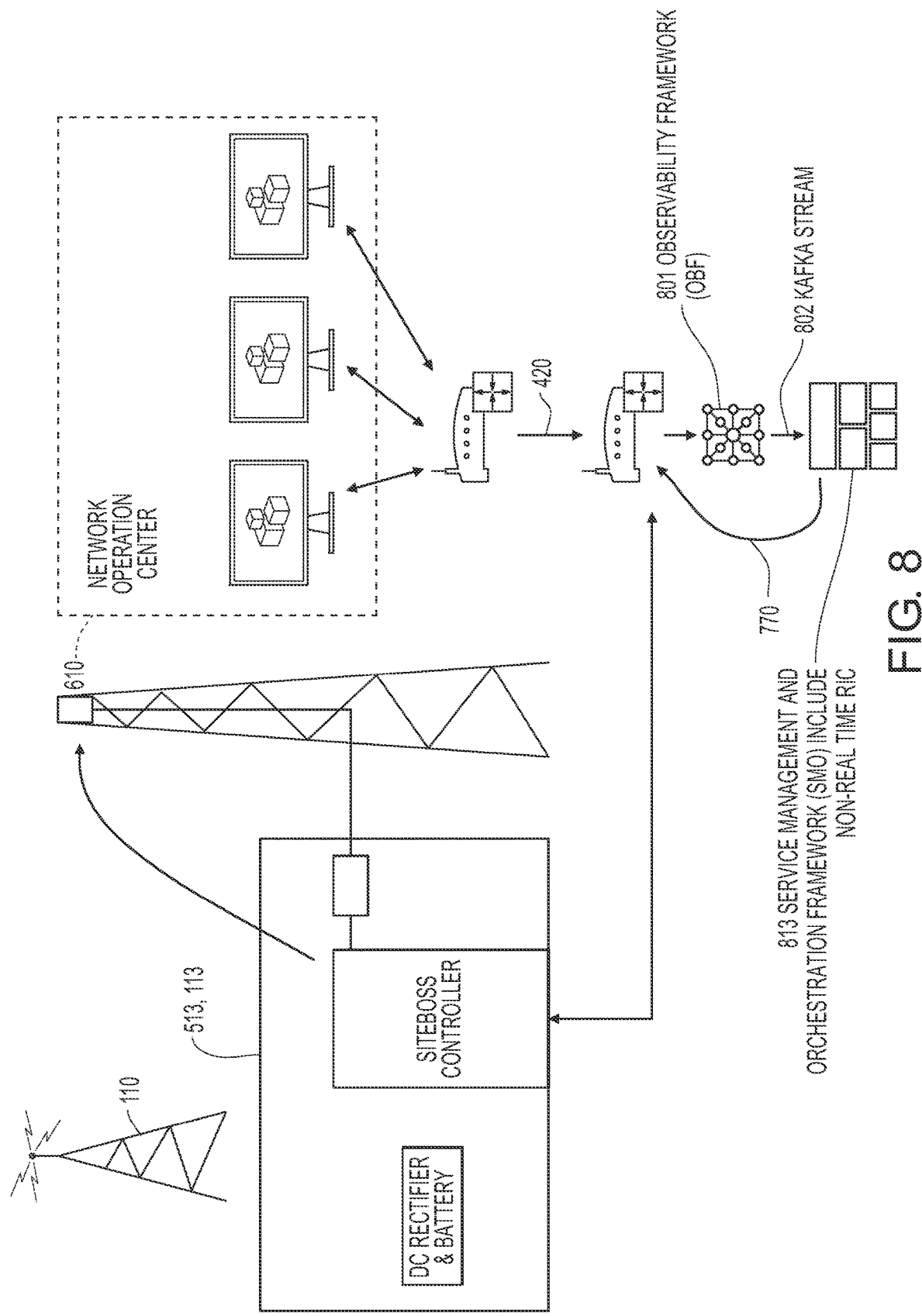
FIG. 8 illustrates a block diagram of a cellular network according to some embodiments.

FIGS. 7 and 8 show cellular networks according to embodiments herein. Traditionally, cell site events including power outages are sent to the NOC 210. However, in embodiments herein, the event is also sent from telecom site automation system to OBF 701 by adding the OBF IP address in a SNMP trap destination. When OBF 701 receives the SNMP trap, OBF 701 can convert/replicate the traps to events 400 for event store/stream-processing software. The event store/stream-processing software can be built into the OBF 701.

After the event store/stream-processing catalogues these events 400, they can be handled in one of two ways described below, and shown in FIGS. 7 and 8, respectively.

EMS/NMS Built-in Intelligence Monitoring and Control

While the network is running the support module will collect various data to ensure the network is running properly and efficiently. This observability framework ("OBF") collects telemetry data from all network functions that will enable the use of artificial intelligence and machine learning to operate and optimize the cellular network.

This adds to the telecom infrastructure vendors that support the RAN and cloud-native technologies as a provider of Operational Support Systems ("OSS") services. Together, these OSS vendors will aggregate service assurance, monitoring, customer experience and automation through a singular platform on the network.

The OBF brings visibility into the performance and operations of the network's cloud-native functions ("CNFs") with near real-time results. This collected data will be used to optimize networks through its Closed Loop Automation module, which executes procedures to provide automatic scaling and healing while minimizing manual work and reducing errors.

FIG. 7 shows a diagram of a cellular network according to embodiments herein. As discussed above, the operating parameters of the RRU or RRUs 113 operating the cells are monitored. In embodiments herein, the OBF 712 operates to collect telemetry data from all network functions. This, in combination with the use of cloud computing, enables the use of artificial intelligence and machine learning to operate and optimize the cellular network. One of the functions of the OBF 712 is to collect SNMP traps and convert them to events such as power-related events, which cloud based network management software can recognize.

In the embodiment of FIG. 7, EMS (Element Management System) or NMS (Network Management System) 713 are cloud based network functions. This software communicates with the RRU 113 via the OBF 701 in order to alert the artificial intelligence network manager of an event (e.g. power outage) at the RRU 113. In some embodiments, the EMS/NMS 713 acts as a controller of the RRU 113.

These events can be sent to, recognized by, and acted upon by the EMS/NMS 713. The EMS/NMS 713 can directly subscribe to cell site power outage topics in the event store/stream-processing software. Hence, when an event such as a cell site power outage occurs, the built-in intelligence of the EMS/NMS 713 will receive the event through the subscription, will identify cells impacted by the event, and will send Remote Procedure Call (RPC) commands 740 to RRUs 113.

These RPC commands 740 instruct the RRUs 113 to either reduce transmission power or shut down some channels/carriers. This allows the backup battery 305 at the cell site 110 to last a longer time through control of the overall RRU power consumption.

Non-Real-Time RAN Intelligent Controller Monitoring and Control

FIG. 8 shows a diagram of a cellular network according to embodiments herein. In this embodiment, instead of using the EMS/NMS 713 to monitor and respond to events, a Non-Real-Time RAN Intelligent Controller (Non-RT RIC) 813 performs this function utilizing a kafka stream 802 to receive data from OBF 701.

The Non-RealTime RIC 813 is an Orchestration and Automation function described by the O-RAN Alliance for non-real-time intelligent management of RAN (Radio Access Network) functions. The primary goal of the Non-RealTime RIC 813 is to support non-real-time radio resource management, higher layer procedure optimization, policy optimization in RAN, and providing guidance, parameters, policies and AI/ML models to support the operation of near-RealTime RIC functions in the RAN to achieve higher-level non-real-time objectives. NONRTRIC functions include service and policy management, RAN analytics and model-training for the near-Real Time RICs.

The Non-RealTime RIC 813 can communicate with near-RealTime RIC elements in the RAN via an A1 interface. Using the A1 interface the NONRTRIC can facilitate the provision of A1 Policies; monitor and provide basic feedback on policy state from near-RealTime RICs; provide A1 Enrichment Information as required by near-RealTime RICs; act as a hosting platform for rApps (Non-RealTime RIC applications); host the R1 interface between rApps and the underlying SMO and Non-RT-RIC platforms; and manage the exposure towards rApps of SMO platform functions, Non-RT-RIC platform functions, and the capabilities of other rApps. The NONRTRIC functions support non-real-time control of the RAN (Radio Access Network).

In the embodiment of FIG. 8, these events (i.e. cell-site events stored in the event store/stream-processing software) can be sent to, recognized by, and acted upon by the Non-RT RIC 813. The Non-RT RIC 813 can directly subscribe to cell site power outage topics in the event store/stream-processing software.

Integration with a Cloud-Based Network

Hence, when cell site power outage occurs, the Non-RT RIC 813 sends RPC commands 740 through the O1 interface (e.g., an O1 Observability CM/FM/PM Liaison) to RRUs 113 to either reduce transmission power or shut down some channels/carriers. This allows the backup battery 305 at the cell site 110 to last a longer time through control the overall RRU and cell power consumption.

Traditional cellular networks use a centralized or proprietary server to connection the various RRUs 113 to the internet. This arrangement limits the computational power of the network controller. As a result, as shown in FIG. 6, a human controller 620 is needed to handle network events such as cell power outages. These human controllers 620 are expensive and have performance limitations, including slow reaction times, lack of situational awareness, and human error.

One potential solution would be to implement an artificial intelligence software-based network controller. However, the network control/access servers presently used on cellular networks lack the computational power to perform such functions. Moreover, their geographic remoteness from some of the RRUs in the network limits their ability to quickly react to problems in distant parts of network.

Embodiments herein use a cloud-based network instead of a traditional server for network control and access operations. The computational power of the cloud-based network enables the use of artificial intelligence and machine learning network control software. Also, RRUs in all parts of the network can be controlled in a time-effective manner by this system, because the cloud-based servers are spread over a wide geographic area. Therefore, RRUs can be controlled by software operating on a relatively nearby cloud server. This configuration is what allows the network control software described herein to perform functions that cannot be performed by either a human being or a generic computer.

To implement this system, software is installed over a large number of cloud-based servers. This is accomplished by using a kubernetes cluster. A kubernetes cluster is a set of nodes that run containerized applications. Containerizing applications is an operating system-level virtualization method used to deploy and run distributed applications without launching an entire virtual machine (VM) for each application.

A cluster configuration software is available at a cluster configuration server. This guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such kubernetes clusters to deploy a RAN base station 111 so that the vDU 114 corresponding to the RAN base station 111 is located at one kubernetes cluster and the vCU 115 is located at a remote location from the vDU 114. This configuration allows for a more stable and flexible configuration for the RAN base station 111 and cell site 110 generally.

The cell sites, including cell site 110, provide cellular service to the client devices (e.g., user equipment U1-U3) through the use of a vDU 114 and a tower 111a. The server at a cell site 110 controls the vDU 114 located at the cell site 110, which in turn controls communications from the tower 111a. The or each vDU 114 includes software to control the communications with the towers 111a, RRUs 113, and vCU 115 so that communications from client devices (user equipment or UEs) can communicate from one tower 111a through the kubernetes clusters to another cellular tower. In other words, the voice and data from a UE transmits to the towers 111a and then goes through the vDU 114 to transmit such voice and data to another vDU 114 to output such voice and data to another tower 111a. This allows transmission from one UE to another UE.

Artificial Intelligence & Machine Learning Software

Figure 9:
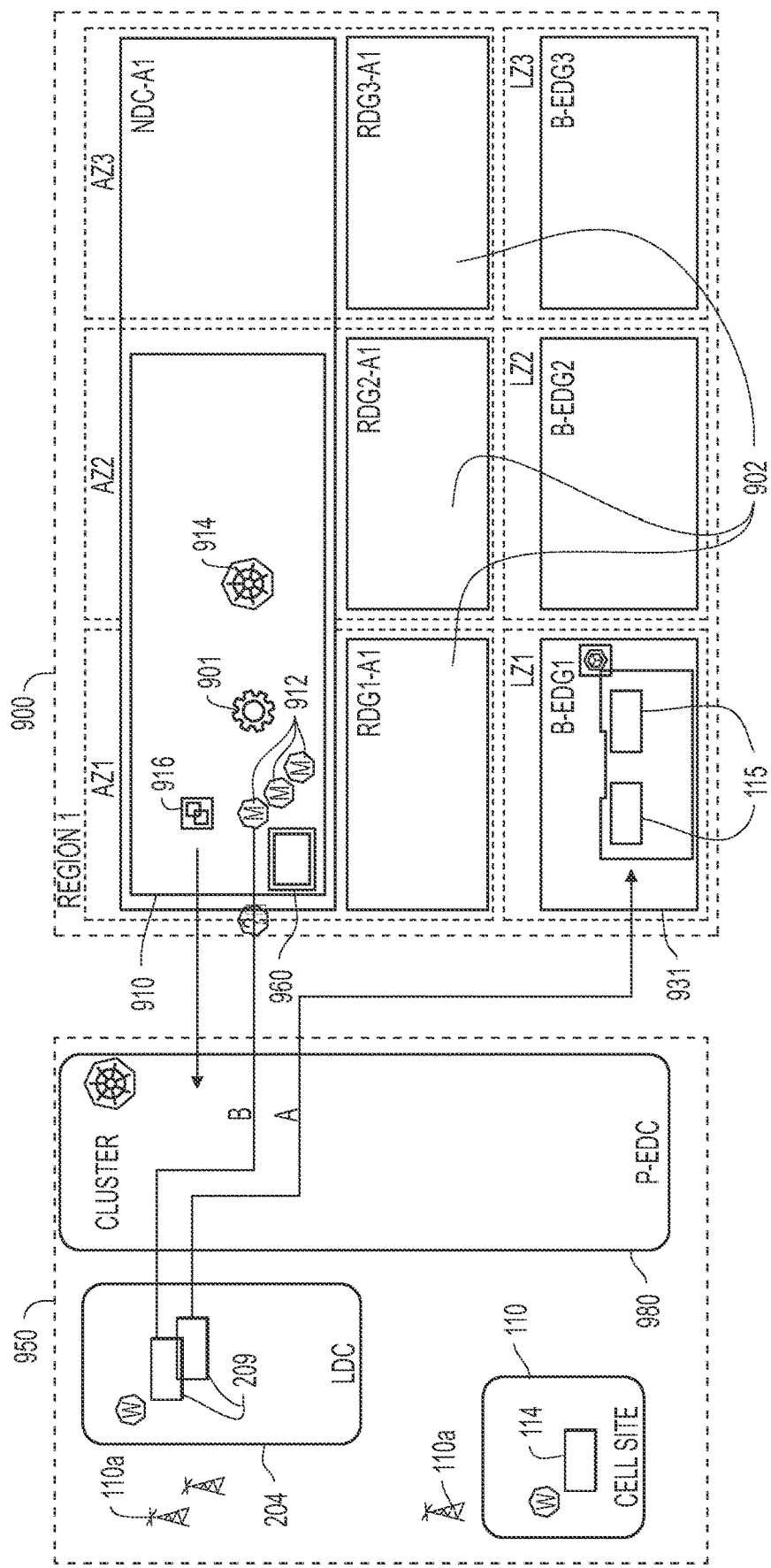
FIG. 9 illustrates a block diagram of stretching the kubernetes clusters from a public network to a private network, according to various embodiments.

The software architecture of embodiments herein is shown in FIG. 9. Here, the vDUs 114 on each individual cell site 110 or central office 514/Local Data Center (LDC) may not have enough computing power to run a control plane that supports the functions in the mobile telecommunications system to establish and maintain the user plane. As such, the control plane is then run in a location that is remote from the cell sites 110, such as a Regional Data Center (RDC) 902. The RDC 902 is implemented on a cloud-based public network 900. This control plane can be e.g. artificial intelligence network control software.

The RDC 902 is the management cluster which manages the central office 514 and a plurality of cell sites, one of which is depicted as cell site 110. As mentioned above, the control plane may be deployed in the RDC 902. The control plane maintains the logic and workloads in the cell sites from the RDC 902 while each of the kubernetes containers is deployed at the cell site 110. The control plane also monitors that the workloads are running properly and efficiently in the cell site 110 and fixes any workload failures. If the control plane determines that a workload fails at the cell site 110, for example, the control plane may redeploy the workload on the cell site 110, for example to another of the cell sites or another component connected to the public network 900.

The RDC 902 may include a kubernetes master 912 (or kubernetes master module), a kubernetes management module 914 and a virtual (or virtualization) module 916. The master module 912 monitors and controls the kubernetes workers and the applications running thereon, such as the vDUs 114. If a vDU 114 fails, the master module 912 recognizes this, and will redeploy the vDU 114 automatically. In this regard, the kubernetes clusters system has intelligence to maintain the configuration, architecture and stability of the applications running. In this regard, the kubernetes clusters system may be considered to be "self-healing" or "machine learning."

The artificial intelligence network control software can operate by generating a model of the radio access network and associated components such as RAN base station 111. The software can then be run under simulation conditions in order to perform machine learning. During the simulated operation of the network controller, optimization of the operating parameters is performed in order to improve performance of the network control software. For example, a simulation of the battery storage level of RRUs in a network can be run on the network control software prior to implementation.

The network control software then issues different RPC commands to the RRUs under simulation using different power saving measures (discussed further below). The software can determine after several simulation runs which approach resulted in the best power savings, longest service maintenance, better network speeds, and so forth. These simulations can include power outages of different durations, and in different geographic areas of the network. Repeatedly performing such simulations and modifying the operating parameters of the software to optimize results constitutes software machine learning.

Furthermore, once the network control software is implemented, further improvements can be made in a similar fashion as in under simulation conditions. Thus, the performance of the network can be incrementally improved over its operating life.

The management module 914 along with an Automation Platform 901 creates the kubernetes clusters in the central office 514 and cell sites 110. For each of the vDUs 114 in the central office 514 and the cell sites 110, an operating system is loaded in order to run the kubernetes workers. The vDUs 114 are also implemented by software that runs on the kubernetes workers. In this regard, the software layers are the operating system, and then the kubernetes workers, and then the vDUs 114.

The central office 514 may be a local data center that can support multiple vDUs 114 and multiple towers 111a for cellular communications. The central office 514 is similar to the cell sites 110 except that each central office has multiple vDUs 114 and multiple towers 111a associated therewith. Each server in the central office 514 (as compared with the vDU 114 in each cell site 110) may support multiple towers 111a. The server in the central office 514 may be different from the server in the cell site 110 because the servers in the central office may be larger in memory and processing power (for example number of cores) relative to the servers in the individual cell sites 110. In this regard, each server in the central office 514 may run multiple vDUs 114. In some embodiments, each server may run 2 or more, or 3 or more, or exactly 2 vDUs 114, where each of these vDUs 114 independently operates a cell tower 111a. Thus, multiple towers 111a can be operated through the central office 514 using multiple vDUs using the kubernetes clusters. The central office 514 or multiple central offices may be placed in bigger metropolitan areas whereas individual cell sites 110 may be placed at smaller population areas.

FIG. 9 also illustrates cell sites 110 that are configured to be clients of each cluster. Each cell site 110 is shown as including a cellular tower 111a and a connection to each distributed unit (DU), similar to FIG. 2. Each DU is labeled as a virtualized distributed unit (vDU) 114, similar to FIG. 2, and each vDU runs as virtual network functions (VNFs) within the an open source network functions virtualization (NFV) infrastructure.

Regionalized Network Implementation

FIG. 9 also illustrates a block diagram of stretching the kubernetes clusters from a public network (e.g. cloud-based network) 900 to a private network 950 and across the availability zones, according to various embodiments.

This is done by the automation platform module 901 creating master modules 912 in the control plane 910 located within the public network 900. The kubernetes clusters are then created as explained above but are created in both public and private networks 900, 950.

The public network 900 shown in FIG. 9 shows an exemplary embodiment where there are three availability zones AZ1, AZ2 and AZ3. These three availability zones AZ1, AZ2 and AZ3 are in three different geographical areas. For example, AZ1 may be in the western area of the United States, AZ2 may be in the midwestern area of the United States, and AZ3 may be in the eastern area of the United States.

A national data center (NDC) 920 is shown as deployed over all three availability zones AZ1, AZ2 and AZ3 and the workloads will be distributed over these three availability zones AZ1, AZ2 and AZ3. It is noted that the NDC 920 is a logical creation of the data center instead of a physical creation over these zones. The NDC 920 is similar to the RDC 902 but instead of being regional, it is stretched nationally across all availability zones.

It is noted that the control plane 910 stretches across availability zones AZ1 and AZ2 but could be stretched over all three availability zones AZ1, AZ2 and AZ3. If one of the zones fails the control plane 910 would automatically be deployed on the other zone. For example, if zone AZ1 fails, the control plane 910 would automatically be deployed on AZ2. This is because each of the software programs which are deployed on one zone are also deployed in the other zone and are synced together so that when one zone fails, the duplicate started software automatically takes over. This creates significant stability.

Moreover, because the communication is to and from a private network, the communications between the public and private networks may be performed by pre-authorizing the modules on the public network to communicate with the private network.

The private network 950 includes the central office 514 and cell sites 110 as well as an extended data center (EDC) 980. The central office 204 and cell sites 110 interact with the EDC 980 as the EDC 980 acts a router for the private network 950. The EDC 980 is configured to have a concentration point where the private network 950 will extend from. All of the central offices 514 and cell sites 110 may connect to only the EDC 980 so that all of the communications to the private network 950 can be funneled through one point. This may improve security and/or efficiency.

The kubernetes master modules 912 control the vDUs 114 so that the clusters are properly allowing communications between the private network 950 and the public network 900. There are multiple master modules 912 so that if one master module fails, one of the other master modules takes over. For example, as shown in FIG. 9, there are shown three master modules 912 and all three are synced together so that if one fails, the other two are already synced together to automatically become the controlling master. However, the number of master modules 912 is not so limited and may be only 1, or 2, or 3, or 4 or more.

Each of the master modules 912 performs the functions as discussed above, including creating and managing the vDUs 114. This control is shown over path B which extends from a master module 912 to each of the vDUs 114. In this regard, the control and observability of the vDUs 114 occurs only in the public network 900 and the vDUs 114 and the kubernetes clusters are in a private network 950.

There is also a module for supporting functions and Platform as a Service (PaaS) 960 (the support module 960). There are some supporting functions that are required for observability and this support module 960 will provide such functions. The support module 960 manages all of the vDUs 114 from an observability standpoint to ensure it is running properly and if there are any issues with the vDUs 114, notifications will be provided. The support module 960 is provided on the public network 900 to monitor any of the vDUs 114 across any of the availability zones.

The master modules 912 thus create and manage the kubernetes clusters and create the vDUs 114 and the support module 960, and the support module 960 then supports the vDUs 114. Once the vDUs 114 are created, they run independently, but if a vDU fails (as identified by the support module 960) then the master module 912 can restart the vDU 114.

Once the software (e.g., clusters, vDUs 114, support module 960, master module 912, and others) is set up and running, the user voice and data communications received at the towers 111a and is sent over the path of communication A so that the voice and data communications is transmitted from tower 111a, to a vDU 114, and then to the vCU 115 in a Kubernetes cluster 931. This path of communication A is separate from the path of communication B for management of the DUs for creation and stability purposes.

Observability Framework

As noted above, OBF brings visibility into the performance and operations of the CNFs with near real-time results. This collected data will be used to optimize networks through its Closed Loop Automation module, which executes procedures to provide automatic scaling and healing while minimizing manual work and reducing errors.

Figure 10:
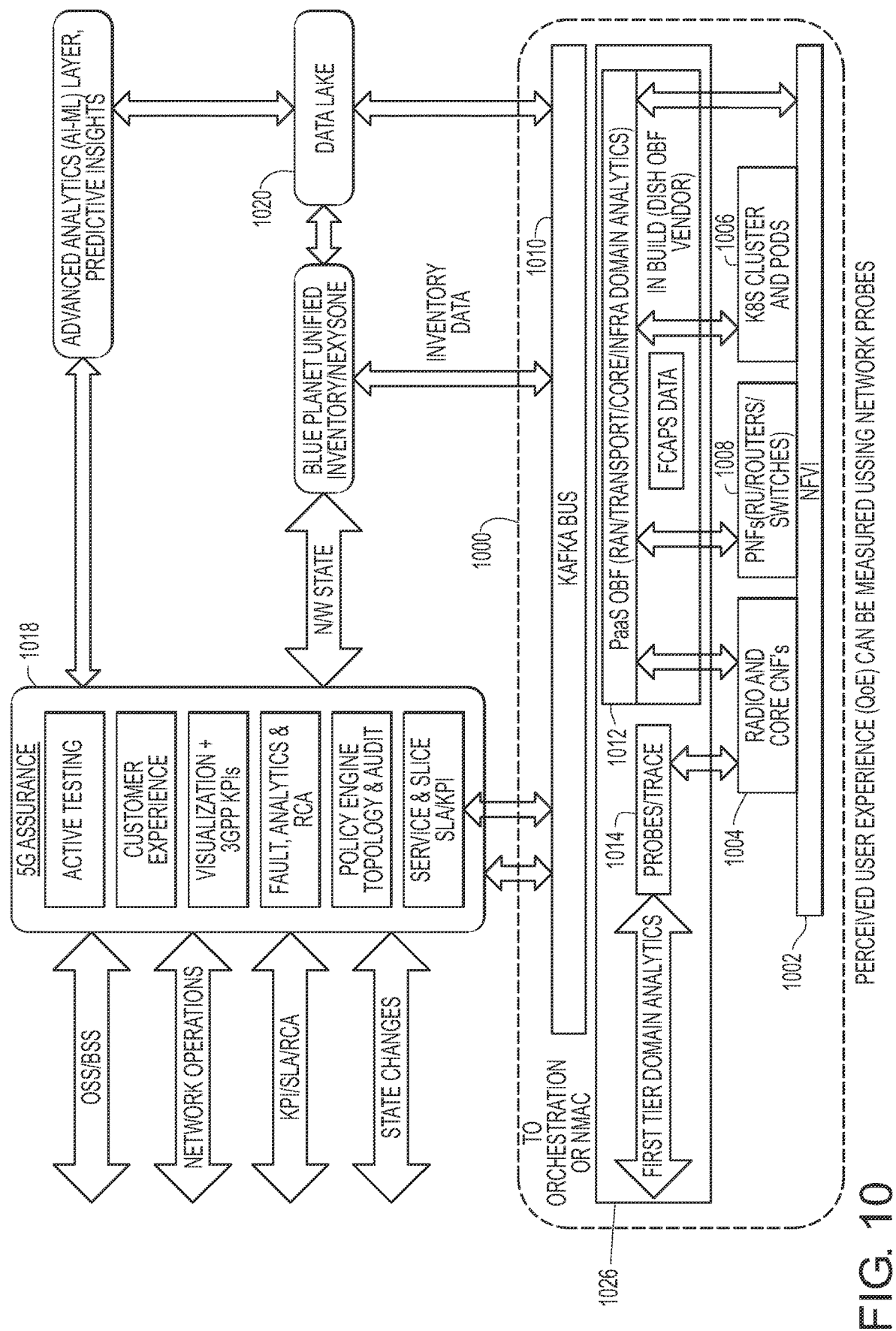
FIG. 10 illustrates the network described of FIG. 9 and others, and also explains how data is collected according to various embodiments.

This is shown in FIG. 10, which is described below.

FIG. 10 is another representation of components of the network described with respect to FIG. 9 above but also explains how data is collected according to various embodiments. The system 1000 includes the networked components as well as the observability layers.

First, a network functions virtualization infrastructure ("NFVI") 1002 encompasses all of the networking hardware and software needed to support and connect virtual network functions in carrier networks. This includes the kubernetes cluster as discussed herein.

On top of the NVFI 1002, there are various domains, including the Radio (or RAN) and Core CNFs 1004, kubernetes clusters and pods (e.g., containers) 1006 and physical network functions ("PNFs") 1008. The PNFs may include hardware components such as an RU (e.g., RRU 113), routers, switches and other hardware components of the cellular network. These domains are not exhaustive and there may be other domains that could be included as well.

The domains transmit their data using probes/traces 1014 to a common source, namely a Platform as a Server ("PaaS") OBF layer 1012. The PaaS OBF layer 1012 may be located within the support module 960 on the public network 900 of FIG. 9 so that it is connected to all of the vDUs 114 and vCUs 115 to pull all of the data from the RANs and Core CNFs 1004. As such, all of the data relating to the RANs and Core CNFs 1004 are retrieved by the same entity deploying and operating each of the vDUs 114 of the RANs as well as the operator of the Core CNFs 1004. In other words, the data and observability of these functions do not need to be requested from vendors of these items and instead are transmitted to the same source which is running these functions, such as the administrator of the cellular network.

The data retrieved are key performance indicators ("KPI") and alarms/faults. KPI are the critical indicators of progress toward performing cellular communications and operations of the cellular network. KPIs provides a focus for strategic and operational improvement, create an analytical basis for decision making and help focus attention on what matters most. Performing observability with the use of KPIs includes setting targets (the desired level of performance) and tracking progress against that target.

The PaaS OBF and event bus retrieves the distributed data collection system so that such data can be monitored. This system uses the kubernetes cluster structure, uses event handling as an intermediate node of data convergence, and finally use data storage for storing the collected and analyzed data.

In this system, the actual data collection tasks may be divided into two different functions. First the PaaS OBF is responsible for collecting data from each data domain and transmitting it to event bus and then, the event bus is responsible for persistent storage of data collected from event logging after aggregation. The master is responsible for maintaining the deployment of the PaaS OBF and event bus and monitoring the execution of these collection tasks.

The PaaS OBF performs the actual collection task after registering with the master module. Among the tasks, the PaaS OBF aggregates the collected data into the event bus according to the configuration information of the task, and stores the data in specified areas of the event bus according to the configuration information of the task and the type of data being collected.

Specifically, when PaaS OBF collects data, it needs to segment data by time (e.g., data is segmented in hours), and the time segment information where data is located is written as well as the collected data entity in the event bus. In addition, because the collected data is stored in the event bus in the original format, other processing systems can transparently consume the data in the event bus without making any changes.

In the process of executing the actual collection task, the PaaS OBF also needs to maintain the execution of the collection task, and regularly reports it to the specific event bus, waiting for the master to pull and cancel the consumption. By processing the heartbeat data reported by the subordinate event handler, the controller can monitor the execution of the collection task of the PaaS OBF and the event bus.

As can be seen, all of the domains are centralized in a single layer PaaS OBF. If some of the domains are provided by some vendors and other by other vendors and these vendors would typically collect data at their networks, the PaaS OBF collects all of the data over all vendors and all domains in a single layer and stores the data in a centralized in long term storage using the event bus. This data is all accessible to the system at a centralized database or centralized network, such as network 900 discussed above with regard to FIG. 9. Because all of the data is stored in one common area from various different domains and even from product managed by different vendors, the data can then be utilized in a much more efficient and effective manner.

There are two types of storage areas for collection of the data. The PaaS OBF is the first storage 1016. In this regard, the collection of data is short term storage by collecting data on a real time basis on the same cloud network where the core of the RAN is running and where the master modules are running (as opposed to collecting the data individually at the vendor sites). In this regard, the data is centralized for short term storage, as described above.

Then, the second data storage is shown as box 1018, which is longer term storage on the same cloud network as the first storage 1016 and the core of the RAN. This second data storage allows data that can be used by any applications without having to request the data on a database or network in a cloud separate from the core and master modules.

There are other storage types as well such as a data lake 1020 which provides more of a permanent storage for data history purposes.

It should be noted that the data collected for all storage types are centralized to be stored on the public network, such as the public network 900 discussed above with regard to FIG. 9.

Figure 11:
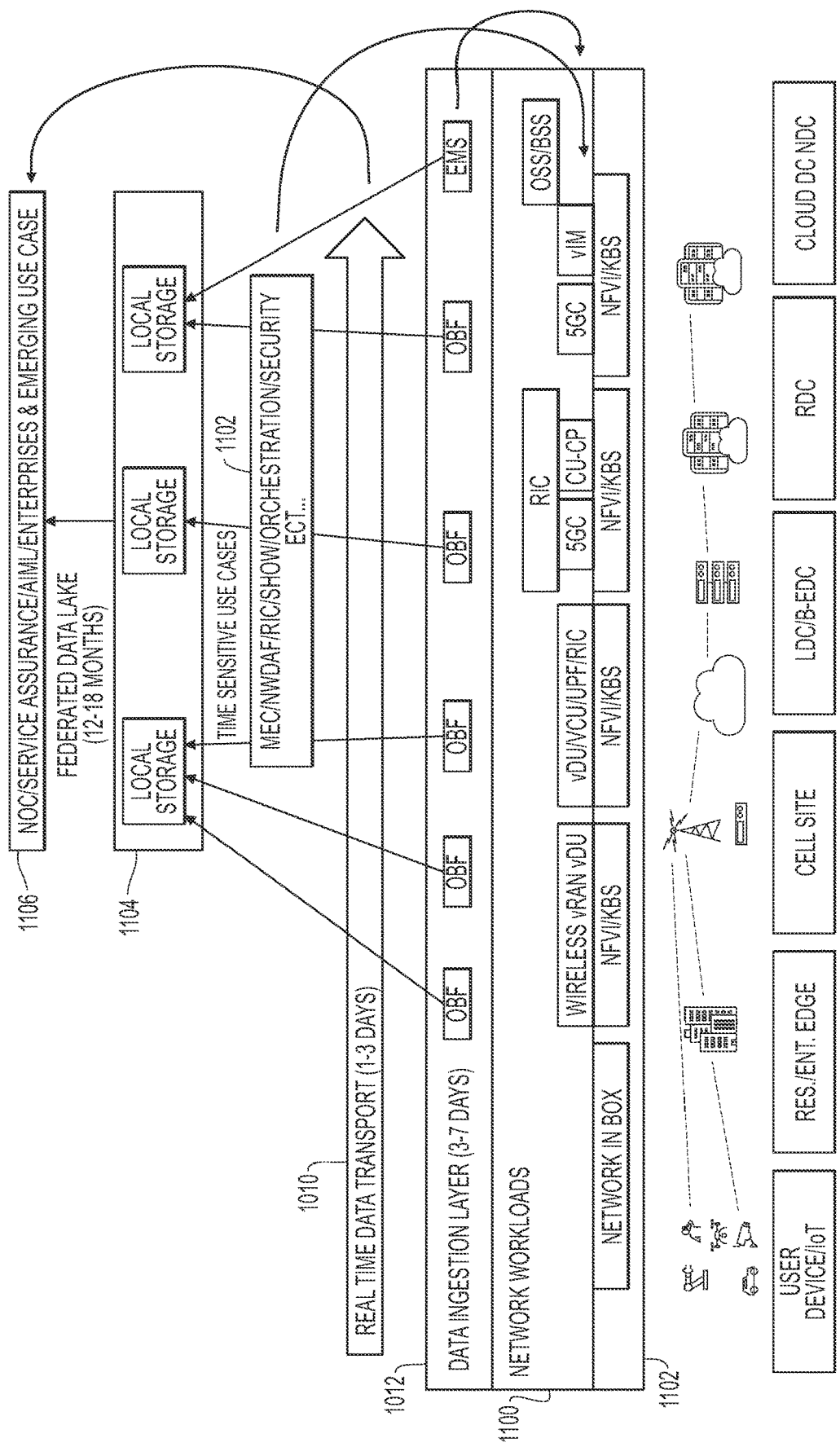
FIG. 11 illustrates an overall architecture of the OBF as well as the layers involved.
Figure 12:
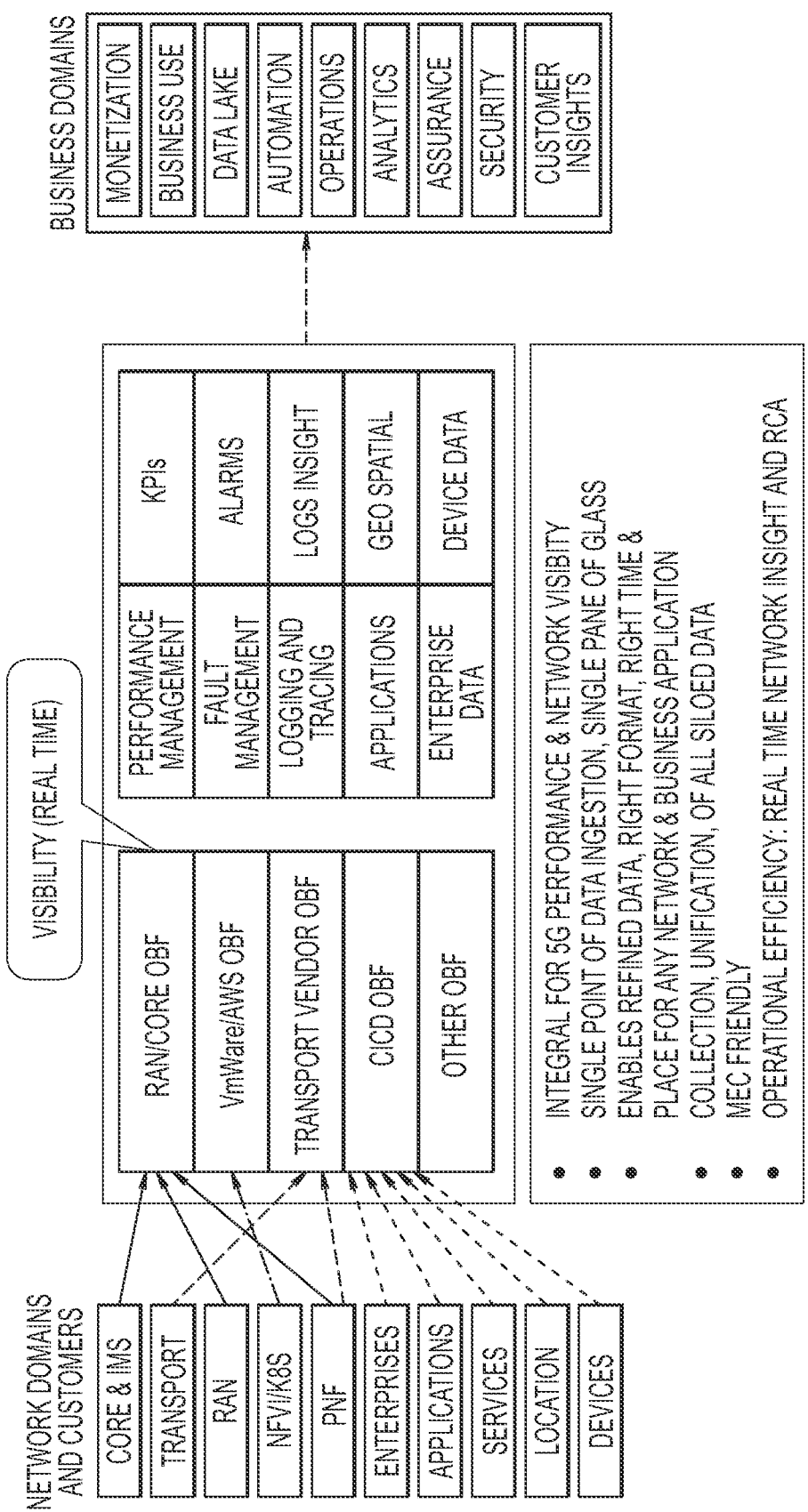
FIG. 12 illustrates an overall architecture of the OBF as well as the layers involved.

FIGS. 11 and 12 show an overall architecture of the OBF as well as the layers involved. First, in FIG. 11, there are three layers shown: the PaaS OBF layer 1012, the event handling layer 1010 (also shown in FIG. 10) and the storage layer 1104. There are time sensitive use applications 1102 which use the data directly from the event handling layer 1010 for various monitoring and other applications which need data on a more real-time basis, such as MEC, security, orchestration, etc. Various applications may pull data from the PaaS OBF layer since this is a real-time data gathering.

There are other use cases 1106 that can obtain data either from the PaaS OBF layer 1012, the event handling layer 1010 and the storage layer 1104, depending on the applications. Some applications may be NOC, service reassurance, AIML, enterprises, and emerging use.

As shown in FIG. 11, there are more details on various domains 1100, such as cell sites (vDU, vRAN, etc.), running on the NFVI 1002 layer. Also, as shown, the NFVI receives data from various hardware devices/sites, such as from cell sites, user devices, RDC, and so on.

In FIG. 12, the network domains and potential customers/ users are shown on the left with core and IMS, transport, RAN, NFC/kubernetes (K8S), PNF, enterprises, applications, services, location, and devices. All of these domains are collected in one centralized location using various OBF collection means. For example, data from the core and IMS, RAN, and NFC/kubernetes domains are collected using the RAN/Core OBF platform of the PaaS layer 1012. Also, data from the RAN and PNF domains are collected on the transport OBF layer. In any event, all of the data from the various domains and systems, whether or not there are multiple entities/vendors managing the domains, are collected at a single point or single database and on a common network/server location. This allows the applications (called "business domains" in the right-hand side of FIG. 12) to have a single point of contact to retrieve whatever data is needed for those applications, such as security, automation, analytics, assurance, and so forth.

Optimization Measures

As discussed above, several actions can be taken to conserve, optimize and/or maximize operation of a network taking into consideration power stored in the backup batteries 305 of one or more of the RRUs 113 at one or more of the macrosites 110a. The backup batteries 305 can maintain operation of a target RRU 113 for a duration on the order of hours. However, this duration varies from a short number of days to less than an hour depending on the storage capacity of the battery. Ideally, service time on backup power should be maximized to avoid a service disruption during a long power outage, scheduled event, or any event affecting power to one or more of the RRUs 113. However, simply increasing the storage capacity of the backup batteries 305 is expensive, particularly when multiplied by the large number of RRUs operating in a modern 5G network. Accordingly, service time and/or coverage maximization is increased by implementing one or more efficiency-increasing measures. As noted above, these measures may be implemented by the RRU 113 in response to an RPC command 740 from the network control software.

Utilizing, for example, the OBF 701 and configuration of FIGS. 7 and 8 described above, the instant application provides for a system of determining locations and types of battery backups that can be provided to specific areas of the telecommunications network.

According to some embodiments, a method of providing cellular service is established. The method of providing cellular service may include steps to prepare for or react to a triggering event. The triggering event may be any event that is likely to require or benefit from power optimization strategies. Such triggering events may be, for example, a power outage, an expected larger or smaller amount of people in a particular area (e.g., for a concert, a sports game, an inauguration or the like), a planned or unplanned maintenance need for one or more components of the cellular network infrastructure, a busier or less busy time of day, and the like.

According to such embodiments, the method may include a step of selecting a predetermined number of macrosites within a coverage area having a plurality of macrosites. The method may further include providing an auxiliary power source for each of the predetermined number of macrosites. Further, upon initiation of a triggering event such as one of the triggering events described above, the method may further include activating the auxiliary power source for each of the selected macrosites, selecting a frequency band to be utilized for each of the selected macrosites, and temporarily disabling at least one macrosite other than the selected macrosites.

Figure 13:
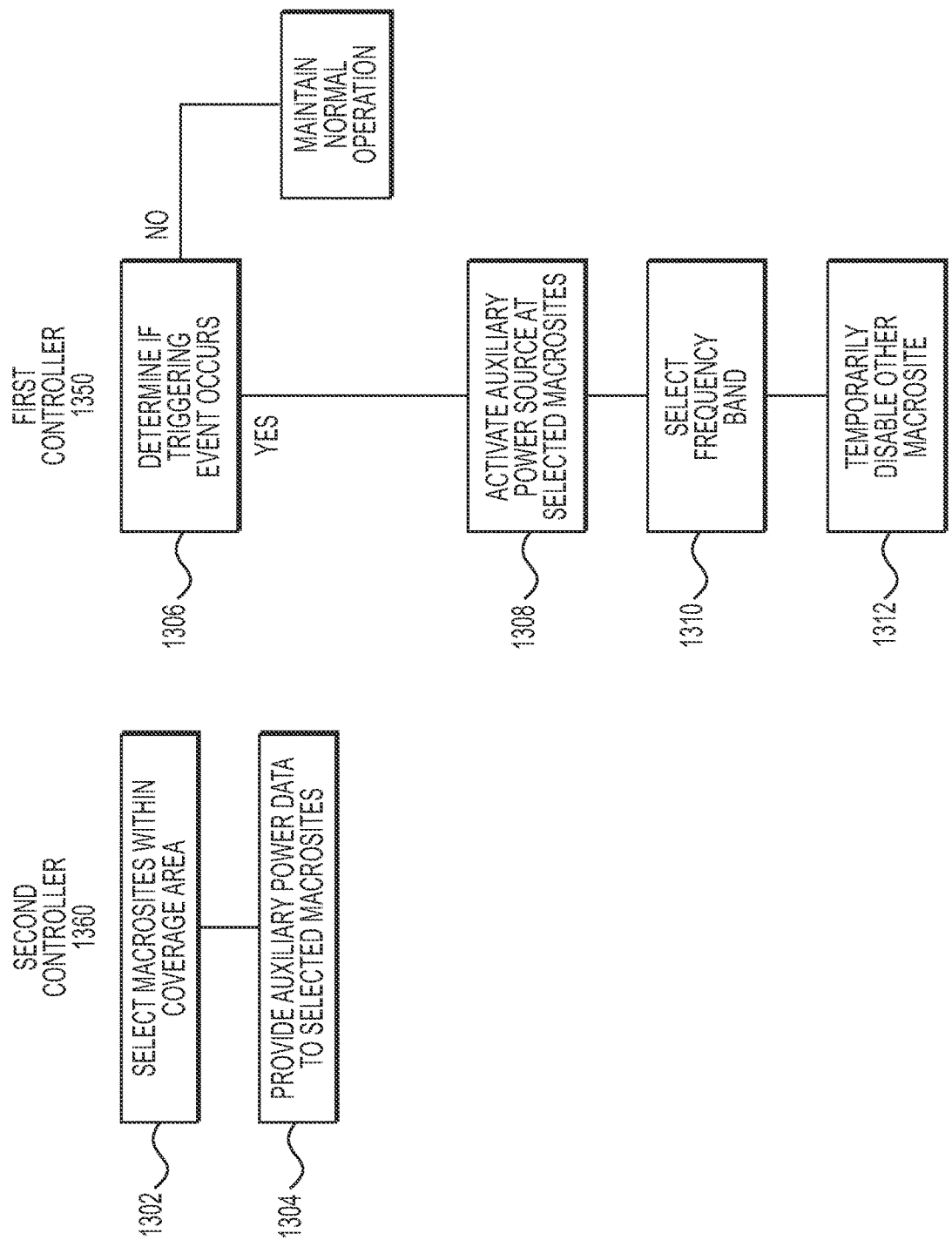
FIG. 13 illustrates a flow diagram of one or more methods according to various embodiments.

Referring to FIG. 13, a step 1302 includes selecting a predetermined number of macrosites within a coverage area having a plurality of macrosites. The selecting the predetermined number of macrosites may be done by a system operator, or automatically by a system, such as the OBF 701 in view of an assessment of certain variables. The variables may be, for example, a location of the macrosites, proximity of the macrosites to locations where cellular service is vital such as a hospital, police station, government building or the like, the ability for the macrosites to achieve certain frequencies, a coverage range of the macrosites, an amount of microsites and small cells operated by the macrosites, a physical location of the macrosites, a size and/or strength of the macrosites, and the like. The OBF 701 or another operation system may be capable of accounting for one or more of such variables in real time or at predetermined time periods, and the selection of the predetermined number of macrosites in step 1302 may change accordingly. Further, any or all of the steps in FIG. 13 may be repeated or performed again at predetermined time periods, either when one or more variable has been changed, or otherwise.

The selected predetermined number of macrosites may be a distinct integer number, and/or may be a percentage of selected macrosites as compared to the plurality of macrosites available within a coverage area. The predetermined number of macrosites may be any subset of the available macrosites within the coverage area. But in some embodiments, the predetermined number is from 10% to 70% of available sites, or less than 60% and more than 20%. In some embodiments, the predetermined number is between 30% and 50%, or is about 25%, about 40% or is exactly 40%. As indicated above, the predetermined number may also be expressed as a finite number, such as a number within the range of 50-250, or 100-200, or 170-190, or about 180 or exactly 180.

Figure 14:
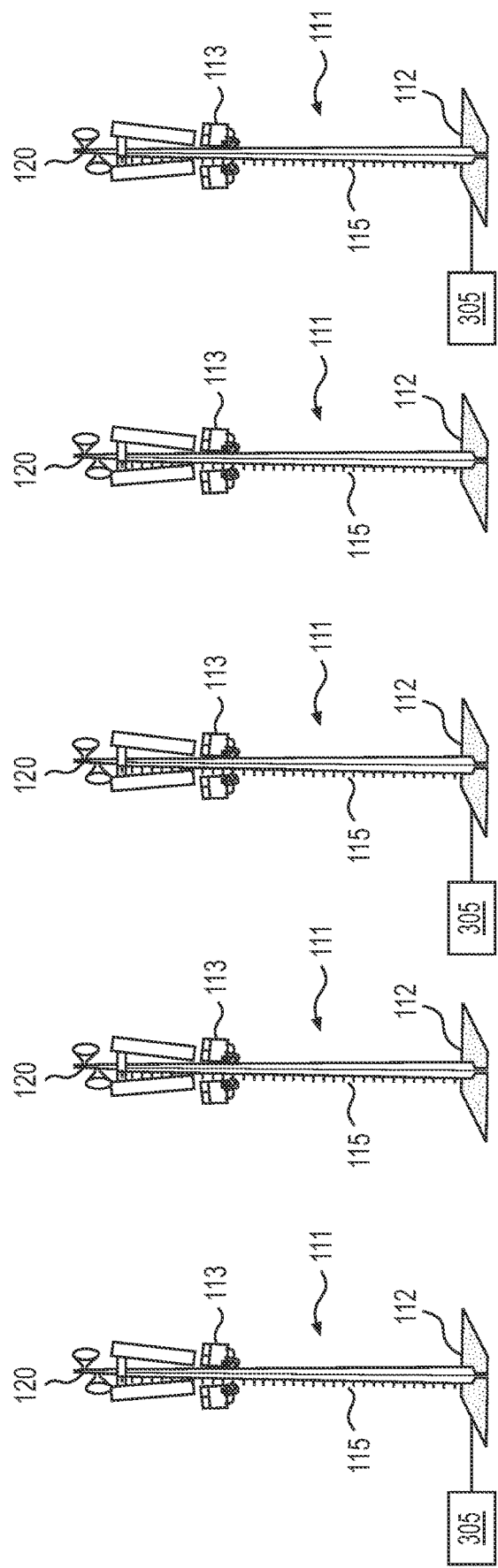
FIG. 14 illustrates a portion of a cellular network according to various embodiments.

After the predetermined number of macrosites are selected, each of the selected macrosites are provided with an auxiliary power source in step 1304. As shown in FIG. 14, a plurality of cell sites 110, each including respective macrosite 110a, are provided. As an example, three of the five macrosites 110a include an auxiliary power source, which in this case is represented by backup battery 305. The other macrosites (e.g., those that are not selected by the step 1302) are not provided with a backup battery 305. The auxiliary power source may be, for example, a battery backup, a portable generator, or some other power source. In some examples, the auxiliary power source will be capable of providing power for a predetermined amount of time, such as at least 2, at least 4, or at least 6 hours, to the macrosite in a case of a power outage that affects the particular macrosite.

In some embodiments, the backup battery 305 is provided to the selected macrosites 110a by a human operator, such as for example an engineer, an electrical installation professional, or the like, once the system described herein indicates to provide such macrosites 110a with the backup battery 305. In some embodiments, the backup battery 305 may be provided to the macrosites 110a by a robot or other automaton, subject to direction from the OBF 701 or other software indicating which macrosites 110a have been selected to have a backup battery 305.

In some embodiments, as described above, only the selected macrosites 110a are provided with the backup battery 305 or any auxiliary power source. This can reduce cost as compared to a situation where all macrosites receive an auxiliary power source. Further, by providing the selected macrosites with the auxiliary power source, in combination with other steps of the instantly described application, an optimal power generation can occur to ensure cellular service to an affected area for a sufficient amount of time even in the case of the triggering event. In some embodiments, steps 1302 and 1304 are operated by second controller 1360, which may be a hardware processor having circuitry, and may be connected to a memory.

A step 1306 determines whether or not the triggering event has occurred. The determination may be performed by a combination of hardware and software using network functions described above, including the OBF 701. In a case where the triggering event has not occurred, the cellular network is instructed to remain in a normal condition, where all macrosites 110*a* at cell sites 110 in the coverage area are provided with power and are able to operate on multiple frequencies, such as a low frequency band and a mid-frequency band, and optionally also a high frequency band. Further, a low-frequency band may be any band operating within a lower frequency range, for example from 410-7150 MHz. As an example, the N77 band, with uplink and downlink of 3300 MHz-4200 MHz, may be a low-frequency band. Other bands, such as bands with uplink and downlink between 7125 MHz and 24250 MHz may be considered a mid-frequency band, and those with uplink and/or downlink of 24250-52600 MHz may be considered a high-frequency band.

In the case where a triggering event has occurred, the method moves to a step 1308 of activating the auxiliary power source or backup battery 305 for each of the selected macrosites 110*a*. The backup battery 305 may then allow for full operation or partial operation of the respective macrosite 110*a* in order to achieve some level of basic service for users of the network 100.

Further in some embodiments, the auxiliary power source or backup battery 305 may be activated for only some macrosites 110*a* that have an available auxiliary power source or backup battery 305. That is, the selected macrosites 110*a* may be only a fraction of the macrosites with available auxiliary power sources. This may be particularly advantageous where a lengthy triggering event is occurring or expected to occur, whereby a minimized number of macrosites 110*a* with auxiliary power sources are used to ensure sufficient coverage (e.g., a basic level of coverage or service), and as such auxiliary power sources begin to run out of power, other macrosites that have auxiliary power sources can be engaged and network functionality can be moved from the macrosite having an expiring auxiliary power source to a new macrosite with an auxiliary power source. In some examples, the sufficient coverage to be provided by the basic level of service is a result of the systems of the instant application instructing to reduce from full coverage or service to the basic level of coverage or service, the reduction including a temporary disabling of at least one feature present in full coverage or service but not in the basic level of coverage or service.

The features provided in the level of basic coverage or service may include the ability to make voice calls and text transmissions (e.g., SMS), and to receive an emergency broadcast signal where at least one user of the users involves with the communication requires use of an affected macrosite within the area having the triggering event. The area may be some or all of the coverage area. Further, the auxiliary power source or backup battery 305 may also be used to allow for full service to be provided (e.g., beyond the basic level of service). Full coverage or service includes coverage features beyond the features provided in the basic level of coverage or service, such as the ability to make video calls, utilize the internet, and so on. A balancing between the desire to provide full service and desire to maintain life of the auxiliary power source (e.g., battery life) may be taken into consideration when determining the level of service to be provided.

In a step 1310, the method includes selecting a frequency band to be utilized at each of the selected macrosites. This step 1310 is an optional step and in some embodiments it is considered that the process omits selecting a frequency band entirely. In some situations, only a low frequency band, such as N77, may be activated on the selected macrosites. This may allow at least the basic level of service to affected users, or may allow for more than a basic level of service to the affected users. In some examples, a low frequency band and an additional band, such as a mid-frequency band, remain operational and additional services may be available to users in such a case.

In a step 1312, the method includes temporarily disabling at least one macrosite that is not one of the selected macrosites. This may include disabling one or more frequency bands to be communicated via by the at least one macrosite, or reducing or entirely shutting down power to the at least one macrosite, for example in a case where the triggering event is not full power outage at the at least one macrosite may be otherwise operational. This may be advantageous to save or optimize power across the network infrastructure. The at least one macrosite may be disabled for a duration of the triggering event, or for a predetermined time period such as about 2 to about 6 hours, or about 4 hours.

In some embodiments, steps 1306, 1308, 1310 and 1312 may be operated by a first controller 1350, which may be a hardware processor having circuitry and may be connected to a memory that stores instructions by which the processor operates. In some embodiments, the first controller 1350 is a processor of the OBF 701. Further, in some embodiments, the first controller 1350 and second controller 1360 are both processors of the OBF 701, and may also be the same processor. In other embodiments, the second controller 1360 may be a separate controller, and may be distinct from the OBF 701.

Owing to the features described herein, preplanning can occur within a cellular network infrastructure in order to allow for optimal or at least sufficient network coverage in the case of a triggering event.

As an example, a predetermined number of radio cell sites 110 or macrosites 110*a* (hereinafter, sites) can be selected as sites with which to provide a backup battery 305 and a low-band frequency (for example, N71 or N77 frequency). The selected predetermined number of sites 110, 110*a* will be able to provide a basic level of coverage (for example, voice call and text call) to a predetermined area, with the predetermined area being some or all of the coverage area, even in a case of power outage or other power-related issue.

Figure 15:
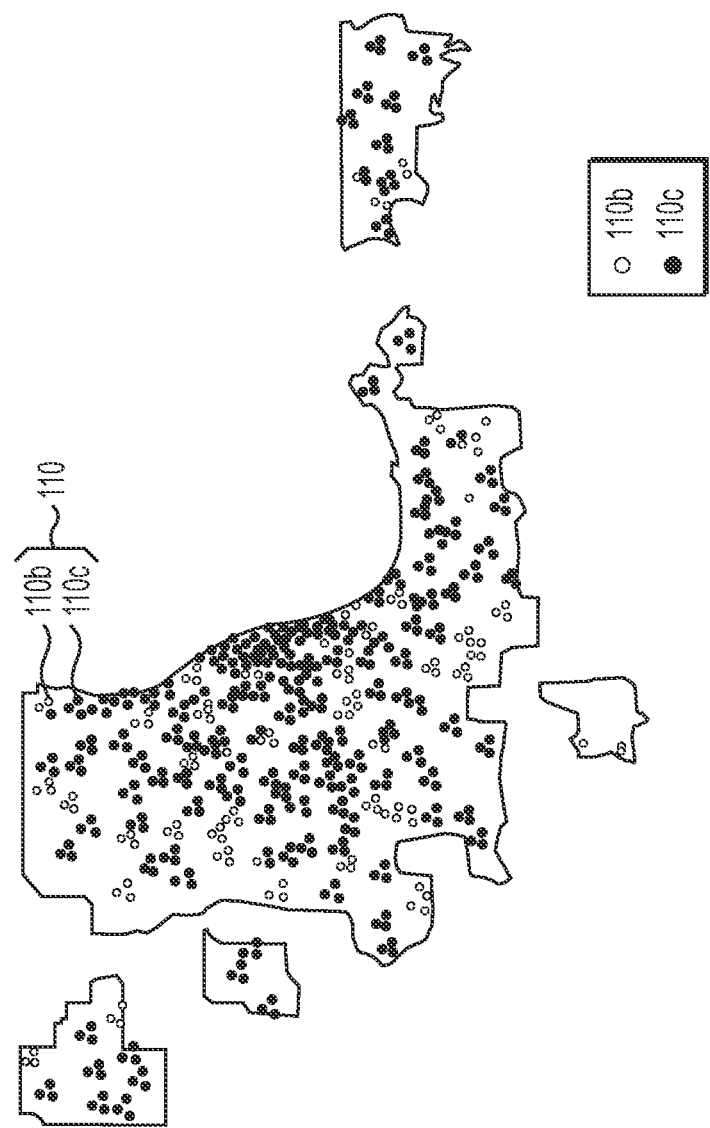
FIG. 15 illustrates a plurality of cell sites according to various embodiments.

FIG. 15 shows an example market with 699 sites 110 providing service to the market. Using optimization methods discussed in more detail herein, 180 of the 699 cell sites are selected as selected sites 110*b* to receive a battery backup. Thus, in this case, the predetermined number is about 25.75% of cell sites (macro sites). The other sites are unselected sites 110*c*. In the case of a triggering event being a power outage that extends within the entire market, the battery backups provided at the 180 selected cell sites 110*b* may be turned on, only a low frequency band may be turned on, and coverage or at least basic coverage can be provided to all users within the market. In some situations, the 180 selected cell sites 110*b* may have a low frequency band and a middle frequency band, but only the low frequency band is turned on in the case of the power outage. Thus, desired basic coverage can be provided and the power of the battery backup can be better saved. However, in some examples, both the low frequency band and middle frequency band for the 180 selected cell sites 110*b* can be maintained on, which may allow for improved coverage quality and/or higher bandwidth-consuming resources to remain usable.

Further, in some examples, some of the cell sites 110c without battery backup may be preselected to, if possible, utilize a low frequency band or even a middle frequency band. This may be particularly relevant in a situation where a power outage is localized and cell sites within the market, even those not selected as ones of the predetermined cell sites, are not affected by a power outage.

While FIG. 15 provides an example, this example is nonlimiting and can be extended to any coverage area with any amount of cell sites and any predetermined number of chosen sites within the embodiments described herein.

The battery backups provided at the cell sites may last for a specific amount of time, for example, 2-6 hours or more. By limiting the band to the low frequency band, the battery life for the battery backups may be extended, allowing for more time to remedy the power outage or otherwise remediate any issue.

The system may also be configured to move all users from one frequency to another, such as the low-band frequency, in a situation where a triggering event such as a power outage is occurring. The users may be moved from one frequency band to another by redirecting transmissions sent from the user's equipment (recognizable by the user's phone number or other identification characteristic) to the preferred frequency band. This may be done by manipulating or changing a setting on the user's equipment, which can be done by the user or by a command sent automatically to a user equipment from the systems and processors described herein and with reference to FIGS. 7 and 8. The system may also be configured to allow only lower-bandwidth actions, such as voice call, text messages, emergency broadcast and the like, in the case of such a triggering event. For example, users utilizing something that requires a large amount of data usage, such as content streaming, may be temporarily stopped from doing so in the case of the triggering event.

In some situations, predetermined characteristics of particularly important sites may be provided with a battery backup and prevented from turning off in the case of a power outage. For example, a site that is near a hospital may be provided with a battery backup or otherwise provided power in the case of a triggering event.

In other situations, when a particular area expects a large amount of users, for example at a concert, sports event, inauguration or the like, more frequency bands will be allotted to such an area and thus the sites can be further optimized.

In some embodiments, a system for preplanning a cellular for a triggering event is provided. The system may include a first hardware processor programmed to detect an initiation of the triggering event, activate an auxiliary power source for the each of selected macrosites; selecting a frequency band to be utilized for the each of the selected macrosites, and temporarily disable at least one macrosite other than the selected macrosites. In some embodiments, the hardware processor includes hardware circuitry and may also be connected to a memory that stores instructions by which the hardware processor is programmed to operate. The hardware processor may be, for example, first controller 1350 shown in FIG. 13.

Further in some embodiments, the system may also include a second hardware processor configured to select a predetermined number of macrosites within a coverage area having a plurality of macrosites; and instruct for an auxiliary power source to be provided to each of the predetermined number of macrosites. The second hardware processor may be the second controller 1360 of FIG. 13. As discussed above, the first controller 1350 and second controller 1360 may be distinct. For example, the first controller 1350 may be a processor of or operating the OBF 701 and the second controller 1360 may be another processor of or operating the OBF 701 or may be a distinct processor. Further, in some embodiments, the first controller 1350 and second controller 1360 are both the same processor of the OBF 701. Still further, in some embodiments, a cellular network comprising an observability framework is envisaged. The network may have a first hardware processor such as first controller 1350 programmed to, while running the OBF 701 or some other program, detect an initiation of the triggering event, activate an auxiliary power source for the each of selected macrosites, select a frequency band to be utilized for the each of the selected macrosites, and temporarily disable at least one macrosite other than the selected macrosites. The network may also include a plurality of macrosites including the selected macrosites and the at least one macrosite other than the selected macrosites and the auxiliary power source for each of the selected macrosites. The network may be a 5G cloud-based network, such as the network described and explained heretofore with respect to FIGS. 1-12.

In some embodiments, the first controller 1350 and/or second controller 1360 may be distributed in a cloud-based environment. For example, the controllers may be provided within multiple clouds that are geographically distributed across more than one location, but may be centrally managed, e.g., by one or more centralized units (e.g., vCU 115) in order to allow for applications to be run at multiple desirable locations.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, the subject matter of this application illustratively disclosed herein suitably may be practiced in the absence of any element(s) that are not specifically disclosed herein.

Although the invention has been described with reference to embodiments herein, those embodiments do not limit the scope of the invention. Modifications to those embodiments or different embodiments may fall within the scope of the invention.

What is claimed is:

1. A method of providing cellular service, comprising:
   detecting initiation of a triggering event associated with a coverage area having a plurality of macrosites;
   activating an auxiliary power source at each of a predetermined number of selected macrosites, the selected macrosites being ones of the plurality of macrosites, wherein a number of the plurality of macrosites is greater than the predetermined number of selected macrosites, and wherein the selecting of the selected macrosites from the plurality of macrosites includes taking into consideration predetermined characteristics of potentially selected ones of the plurality of macrosites; and
   temporarily disabling at least one macrosite other than the selected macrosites.

2. The method according to claim 1, further comprising selecting a frequency band to be utilized for one or more of the selected macrosites.

3. The method according to claim 2, wherein the frequency band to be utilized is a low frequency band.

4. The method according to claim 2, further comprising, upon the detection of the initiation of the triggering event, moving users from one frequency band to the selected frequency band.

5. The method according to claim 2, wherein the selecting a frequency band to be utilized for the each of the selected macrosites takes into consideration a proximity of the each of the selected macrosites to a hospital.

6. The method according to claim 3, wherein, upon the initiation of the triggering event, frequency bands other than the frequency band to be utilized are temporarily disabled for each of the selected macrosites.

7. The method according to claim 1, wherein the triggering event is a power outage affecting at least one part of the coverage area.

8. The method according to claim 1, wherein the predetermined number of selected macrosites is a number representing between 20% and 60% of the plurality of macrosites within the coverage area.

9. The method according to claim 1, wherein the method further comprises, after detecting the initiation of the triggering event, temporarily disabling at least one type of data usage for users.

10. The method according to claim 9, wherein the at least one type of data usage is content streaming.

11. The method according to claim 1, wherein the method further comprises, after detecting the initiation of the triggering event, reducing a level of coverage from a full level of coverage to a basic level of coverage to users within the coverage area.

12. The method according to claim 11, wherein the basic level of coverage includes transmitting an emergency broadcast to the users, text (SMS) service and audio call service.

13. The method according to claim 1, wherein the predetermined characteristics include a location of each of the potentially selected ones of the plurality of macrosites.

14. The method according to claim 13, wherein the predetermined characteristics include a proximity of each of the potentially selected ones of the plurality of macrosites to a hospital.

15. A system for preplanning a cellular network for a triggering event, comprising:
   a cloud-based architecture including a plurality of servers with one or more respective hardware processors, the cloud-based architecture configured to:
      detect an initiation of a triggering event;
      select macrosites from a plurality of macrosites, wherein the selected macrosites are selected by taking into consideration predetermined characteristics of potentially selected macrosites of the plurality of macrosites;
      activate an auxiliary power source for each of the selected macrosites; and
      temporarily disable at least one macrosite other than the selected macrosites.

16. The system according to claim 15, wherein the cloud-based architecture is further configured to:
- select a predetermined number of macrosites within a coverage area having a plurality of macrosites; and
- instruct for an auxiliary power source to be provided to each of the selected macrosites.

17. A cellular network comprising an observability framework, the network having a processor programmed to, while operating the observability framework:
- detect an initiation of a triggering event;
- activate an auxiliary power source for each of selected macrosites, wherein the selected macrosites are selected from a plurality of macrosites, the selecting of the selected macrosites including taking into consideration predetermined characteristics of potentially selected ones of the plurality of macrosites; and
- temporarily disable at least one macrosite other than the selected macrosites.

18. The cellular network according to claim 17, further comprising:
- a plurality of macrosites including the selected macrosites and the at least one macrosite other than the selected macrosites; and
- the auxiliary power source for each of the selected macrosites.

19. The cellular network according to claim 17, wherein the network is a 5G cloud-based network having a public cloud and a private cloud.

* * * * *